(12) United States Patent
Kawahira et al.

(10) Patent No.: US 11,428,991 B2
(45) Date of Patent: Aug. 30, 2022

(54) LIQUID CRYSTAL DISPLAY DEVICE

(71) Applicant: SHARP KABUSHIKI KAISHA, Sakai (JP)

(72) Inventors: Yuichi Kawahira, Sakai (JP); Takako Koide, Sakai (JP); Masahiro Hasegawa, Sakai (JP); Akira Hirai, Sakai (JP); Akira Sakai, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/498,716

(22) Filed: Oct. 11, 2021

(65) Prior Publication Data

US 2022/0121066 A1 Apr. 21, 2022

(30) Foreign Application Priority Data

Oct. 16, 2020 (JP) .............................. JP2020-174295

(51) Int. Cl.
| | |
|---|---|
| G02F 1/1337 | (2006.01) |
| G02F 1/1335 | (2006.01) |
| G02F 1/1368 | (2006.01) |
| G02F 1/13363 | (2006.01) |
| G02F 1/1333 | (2006.01) |
| G02F 1/1343 | (2006.01) |
| G02F 1/1362 | (2006.01) |

(Continued)

(52) U.S. Cl.
CPC ...... *G02F 1/133738* (2021.01); *G02F 1/1368* (2013.01); *G02F 1/13338* (2013.01); *G02F 1/13439* (2013.01); *G02F 1/133512* (2013.01); *G02F 1/133514* (2013.01); *G02F 1/133541* (2021.01); *G02F 1/133553* (2013.01); *G02F 1/133565* (2021.01); *G02F 1/133633* (2021.01); *G02F 1/133638* (2021.01); *G02F 1/136218* (2021.01); *G06F 3/041* (2013.01); *G02F 1/13306* (2013.01); *G02F 2413/02* (2013.01)

(58) Field of Classification Search
CPC ......... G02F 1/133638; G02F 1/136218; G02F 1/133541; G02F 1/133553; G02F 1/133514
USPC ......................................................... 349/12
See application file for complete search history.

(56) References Cited

FOREIGN PATENT DOCUMENTS

| WO | 2016/080385 A1 | 5/2016 |
| WO | WO-2016080385 A1 * | 5/2016 |

* cited by examiner

*Primary Examiner* — Nathanael R Briggs
*Assistant Examiner* — William D Peterson
(74) *Attorney, Agent, or Firm* — ScienBiziP, P.C.

(57) ABSTRACT

The liquid crystal display device includes, sequentially from a viewing surface side to a back surface side: a linearly polarizing plate and a circularly polarizing plate including a first λ/4 retardation layer; a thin-film transistor substrate including a pair of electrodes disposed in a pixel region and a metal line disposed outside the pixel region; a liquid crystal layer containing liquid crystal molecules aligned parallel to the thin-film transistor substrate, alignment of the liquid crystal molecules varying in response to an electric field generated by application of voltage to the pair of electrodes; a color filter substrate including a color filter layer; and a backlight, the thin-film transistor substrate including a second λ/4 retardation layer, the color filter substrate including a reflective layer disposed outside the pixel region and configured to reflect incident light from the backlight toward the back surface.

7 Claims, 25 Drawing Sheets

(51) Int. Cl.
*G06F 3/041* (2006.01)
*G02F 1/133* (2006.01)

LIQUID CRYSTAL DISPLAY DEVICE

CROSS-REFERENCE TO RELATED APPLICATIONS

The present application claims priority under 35 U.S.C. § 119 to Japanese Patent Application No. 2020-174295 filed on Oct. 16, 2020, the contents of which are incorporated herein by reference in their entirety.

BACKGROUND OF THE INVENTION

Field of the Invention

The present invention relates to liquid crystal display devices. More specifically, the present invention relates to a horizontal alignment mode liquid crystal display device.

Description of Related Art

Conventional liquid crystal display devices typically have a structure in which a color filter (CF) substrate is disposed on the viewing surface side of a liquid crystal layer and a thin-film transistor (TFT) substrate is disposed on the back surface side of the liquid crystal layer. Structures are also considered in which a TFT substrate is disposed on the viewing surface side of the liquid crystal layer and a CF substrate is disposed on the back surface side of the liquid crystal layer. For example, WO 2016/080385 discloses a structure in which a TFT substrate is arranged on the viewing surface side and a CF substrate with a reflective layer is disposed closer to the backlight, for an increase in the efficiency of using backlight illumination.

BRIEF SUMMARY OF THE INVENTION

However, in a liquid crystal display device having a CF-TFT inverted structure (liquid crystal display device with the TFT substrate disposed on the viewing surface side) which has a higher luminance than a liquid crystal display device with the CF substrate disposed on the viewing surface side, light is more reflected by the TFT substrate. In an environment with external light (illumination light or sunlight), such a structure makes it difficult to view transmissive display which should be provided by the display device. The reason thereof is presumably as follows.

FIG. 29 is a schematic cross-sectional view of a liquid crystal display device of a comparative embodiment. A liquid crystal display device 1R of a comparative embodiment includes, as shown in FIG. 29, sequentially from the viewing surface side to the back surface side, a first linearly polarizing plate 11, a TFT substrate 100, a first alignment film 31, a liquid crystal layer 40, a second alignment film 32, a CF substrate 200, a second linearly polarizing plate 12, and a reflective polarizing plate 13. The liquid crystal molecules in the liquid crystal layer 40 are horizontally aligned by the controlling forces of the first alignment film 31 and the second alignment film 32 in the state where voltage is not applied between paired electrodes in the TFT substrate 100 (no-voltage-applied state). The liquid crystal molecules rotate in the in-plane direction according to the electric field generated in the liquid crystal layer 40 in the state where voltage is applied between the paired electrodes (voltage-applied state). The first linearly polarizing plate 11 and the second linearly polarizing plate 12 are absorptive polarizing plates. The reflective polarizing plate 13 is a linearly polarizing plate.

The TFT substrate 100 includes, sequentially from the viewing surface side to the back surface side, a supporting substrate 110, a gate insulator 120, source lines 102 in a source line layer 130, a first interlayer insulating film 140, a flattening film 190, a common electrode (solid electrode) 150, a second interlayer insulating film 160, and pixel electrodes (slit electrodes) 170. The CF substrate 200 includes, sequentially from the viewing surface side to the back surface side, an overcoat layer 240, a CF layer 230, a black film 222, a reflective layer 221, and a supporting substrate 210.

In the TFT substrate 100 disposed on the viewing surface side in the liquid crystal display device 1R of the comparative embodiment, as shown in FIG. 29, the metal lines (for example, source lines 102) having a high reflectance and disposed in the non-opening portion (outside a pixel region 10AA) reflect external light L, increasing the reflectance. Also, the opening portion (inside the pixel region 10AA) has a multilayer structure in which components such as the supporting substrate 110, the gate insulator 120, the first interlayer insulating film 140, and the flattening film 190 are disposed, and the difference between the interlayer refractive indexes here causes multilayer film interference, resulting in reflection of light. This increases the reflectance. For these reasons, in the liquid crystal display device 1R of the comparative embodiment in which the TFT substrate 100 is disposed on the viewing surface side, light is greatly reflected by the TFT substrate 100, which may make it difficult to view the transmissive light in the liquid crystal display device in an environment with external light L.

In response to the above issues, the present invention aims to provide a horizontal alignment mode liquid crystal display device having a structure with a thin-film transistor substrate disposed on the viewing surface side, which prevents reflection of external light to provide transmissive display excellent in display quality while achieving an increased luminance.

(1) One embodiment of the present invention is directed to a liquid crystal display device including, sequentially from a viewing surface side to a back surface side: a circularly polarizing plate including a linearly polarizing plate and a first λ/4 retardation layer; a thin-film transistor substrate including a pair of electrodes disposed in a pixel region and a metal line disposed outside the pixel region; a liquid crystal layer containing liquid crystal molecules aligned parallel to the thin-film transistor substrate, alignment of the liquid crystal molecules varying in response to an electric field generated by application of voltage to the pair of electrodes; a color filter substrate including a color filter layer; and a backlight, the thin-film transistor substrate including a second λ/4 retardation layer, the color filter substrate including a reflective layer disposed outside the pixel region and configured to reflect incident light from the backlight toward the back surface.

(2) In an embodiment of the present invention, the liquid crystal display device includes the structure (1), and the color filter substrate includes a black film disposed on a viewing surface side of the reflective layer.

(3) In an embodiment of the present invention, the liquid crystal display device includes the structure (1) or (2), and the thin-film transistor substrate includes a touch panel driving line disposed closer to the viewing surface than the second λ/4 retardation layer is.

(4) In an embodiment of the present invention, the liquid crystal display device includes the structure (1), (2), or (3), and the liquid crystal display device includes a shield electrode between the circularly polarizing plate and the thin-film transistor substrate.

(5) In an embodiment of the present invention, the liquid crystal display device includes the structure (1), (2), (3), or (4), and the second λ/4 retardation layer is a cured product of a photo-polymerizable liquid crystal material.

(6) In an embodiment of the present invention, the liquid crystal display device includes the structure (1), (2), (3), (4), or (5), and the liquid crystal display device further includes a liquid crystal panel driving circuit, wherein the reflective layer is connected to a ground terminal of the liquid crystal panel driving circuit.

(7) In an embodiment of the present invention, the liquid crystal display device includes the structure (6), and the liquid crystal layer contains negative liquid crystals.

The present invention can provide a horizontal alignment mode liquid crystal display device having a structure with a TFT substrate disposed on the viewing surface side, which prevents reflection of external light to provide transmissive display excellent in display quality while achieving an increased luminance.

DETAILED DESCRIPTION OF THE INVENTION

Hereinafter, embodiments of the present invention are described in more detail with reference to the drawings. The present invention is not limited to these embodiments.

Definition of Terms

Herein, the term "viewing surface side" means a side closer to the screen (display surface) of the liquid crystal display device, and the term "back surface side" means a side farther from the screen (display surface) of the liquid crystal display device.

Herein, the "retardation layer" means a retardation layer providing an in-plane retardation of 10 nm or more to at least light having a wavelength of 550 nm. Light having a wavelength of 550 nm is light of a wavelength at which a human has the highest visual sensitivity. The in-plane retardation is defined as R=(ns−nf)×d, where ns represents the in-plane principal refractive index nx or ny of the retardation layer, whichever is greater, and nf represents the in-plane principal refractive index nx or ny of the retardation layer, whichever is smaller. The principal refractive index means a value relative to light having a wavelength of 550 nm, unless otherwise specified. The in-plane slow axis of a retardation layer means an axis extending in the direction corresponding to ns, and the in-plane fast axis thereof means an axis extending in the direction corresponding to nf. The symbol d represents the thickness of the retardation layer. Herein, the "retardation" means in-plane retardation, unless otherwise specified.

Herein, the "λ/4 retardation layer" means a retardation layer providing an in-plane retardation of a quarter of a wavelength (137.5 nm) to at least light having a wavelength of 550 nm, and may be any retardation layer providing an in-plane retardation of 100 nm or more and 176 nm or less.

EMBODIMENTS

Figure 1:
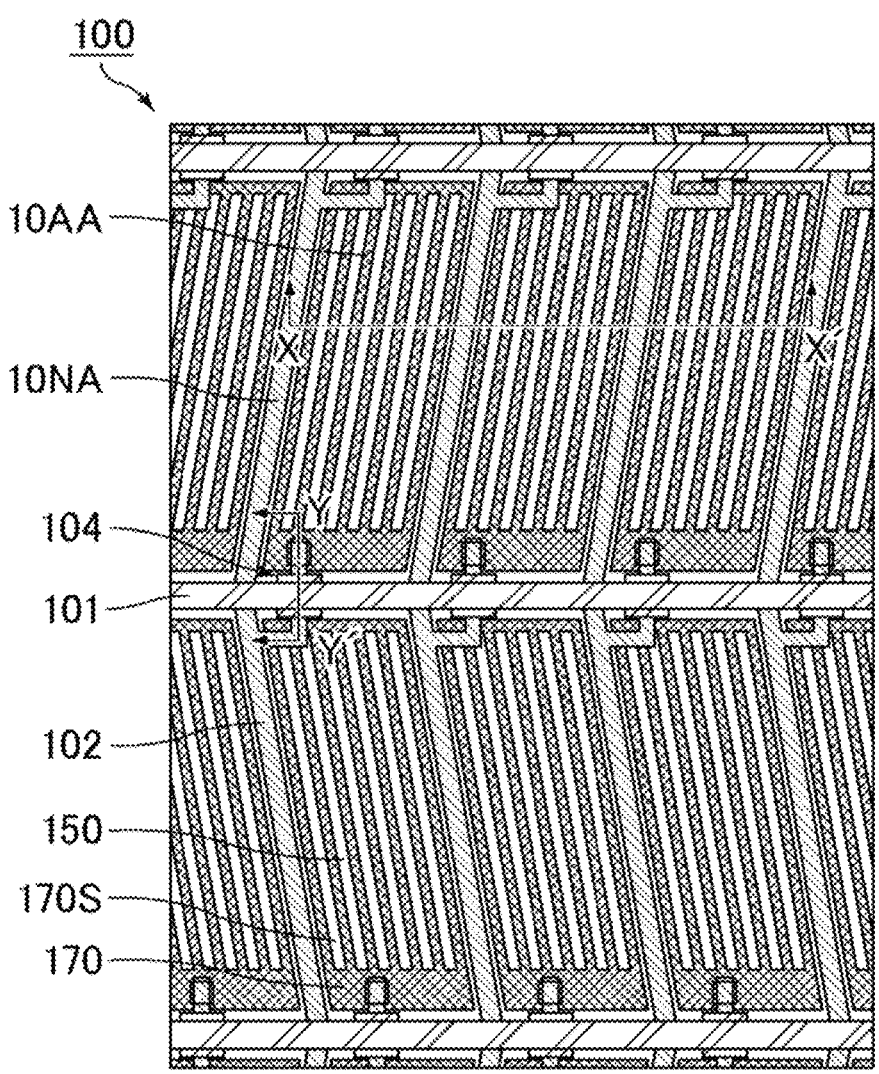
FIG. 1 is a schematic plan view showing the pixel configuration of a viewing surface side substrate (TFT substrate) included in a liquid crystal display device of an embodiment.
Figure 2:
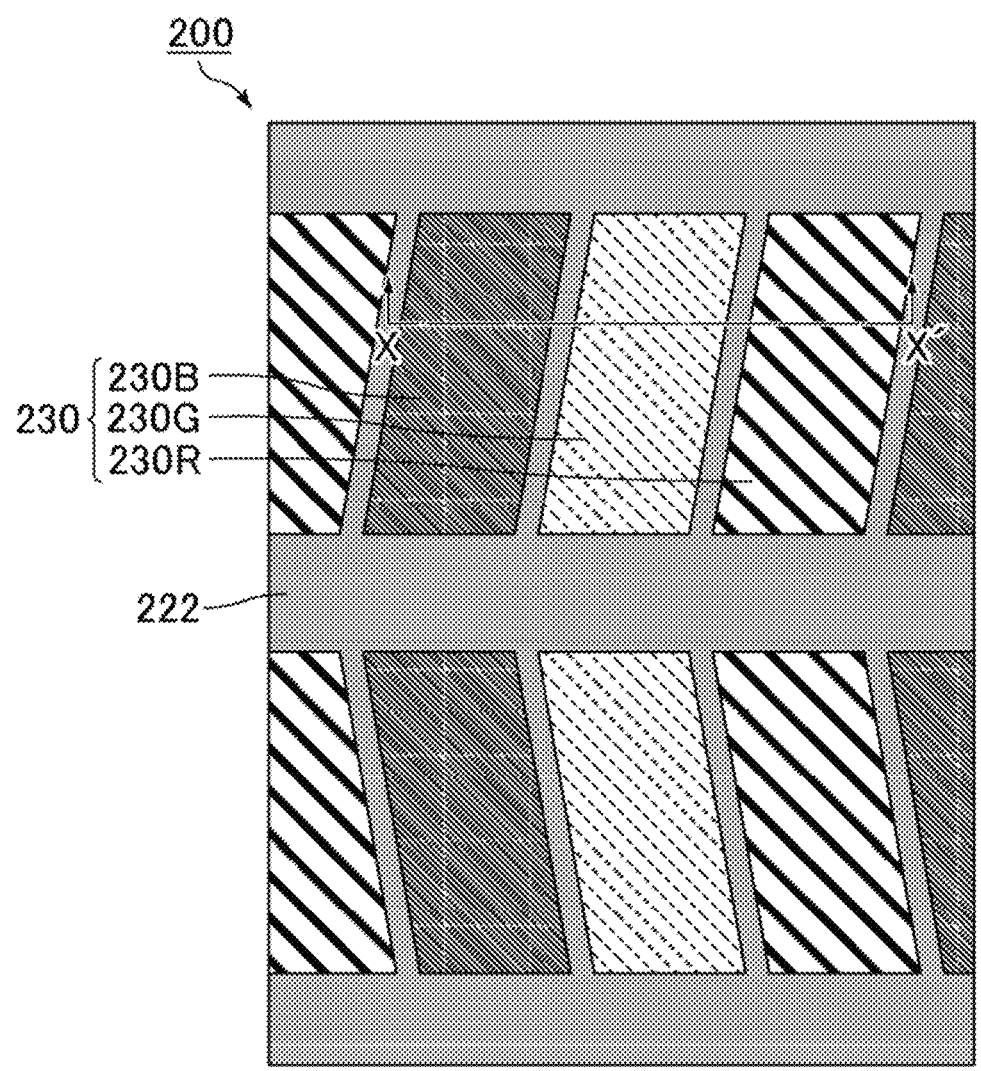
FIG. 2 is a schematic plan view showing the pixel configuration of a back surface side substrate (CF substrate) included in the liquid crystal display device of the embodiment.
Figure 3:
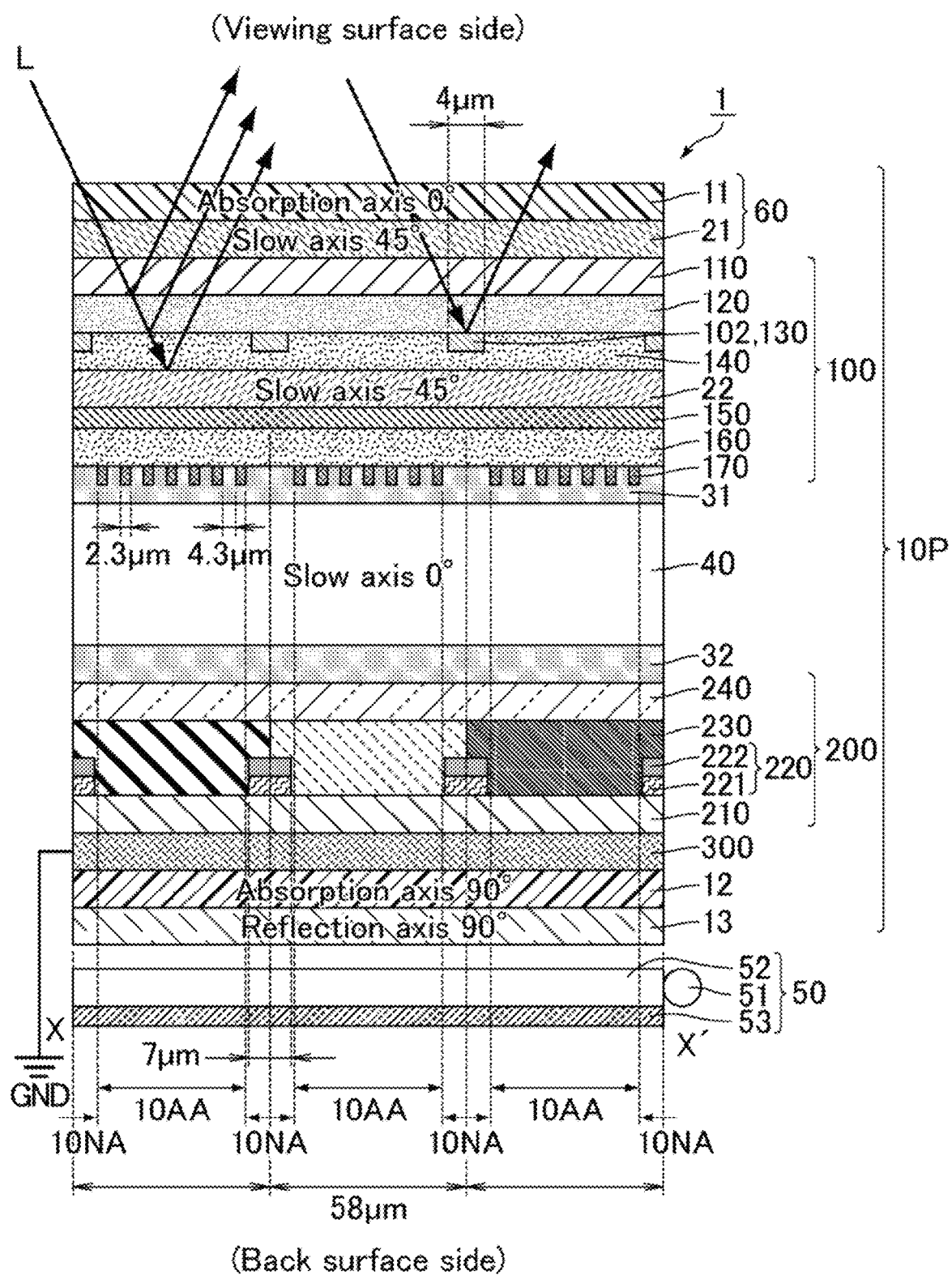
FIG. 3 is a schematic cross-sectional view of the liquid crystal display device of the embodiment taken along the X-X' line in FIGS. 1 and 2.
Figure 4:
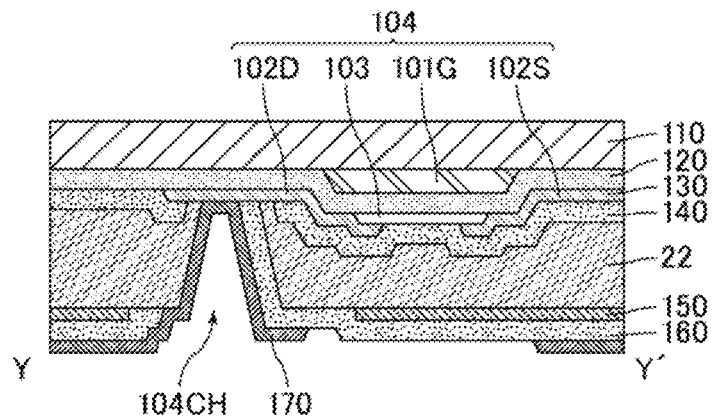
FIG. 4 is a schematic cross-sectional view of the viewing surface side substrate (TFT substrate) taken along the Y-Y' line in FIG. 1.

FIG. 1 is a schematic plan view showing the pixel configuration of a viewing surface side substrate (TFT substrate) included in a liquid crystal display device of an embodiment. FIG. 2 is a schematic plan view showing the pixel configuration of a back surface side substrate (CF substrate) included in the liquid crystal display device of the embodiment. FIG. 3 is a schematic cross-sectional view of the liquid crystal display device of the embodiment taken along the X-X' line in FIGS. 1 and 2. FIG. 4 is a schematic cross-sectional view of the viewing surface side substrate (TFT substrate) taken along the Y-Y' line in FIG. 1. FIG. 1 and FIG. 2 each are a schematic plan view from the viewing surface side.

As shown in FIG. 3, a liquid crystal display device 1 of the present embodiment incudes, sequentially from the viewing surface side to the back surface side, a liquid crystal panel 10P including a circularly polarizing plate 60, a thin-film transistor (TFT) substrate 100, a first alignment film 31, a liquid crystal layer 40, a second alignment film 32, a color filter (CF) substrate 200, and a shield electrode 300; and a backlight 50 disposed on the back surface side of the liquid crystal panel 10P. In this manner, in the present embodiment, the pair of substrates (TFT substrate 100, CF substrate 200) between which the liquid crystal layer 40 is sandwiched is disposed with the TFT substrate 100 on the viewing surface side and the CF substrate 200 on the back surface side. Hereinafter, the typical structure of conventional liquid crystal display devices in which the CF substrate is disposed on the viewing surface side and the TFT substrate is disposed on the back surface side is also referred to as the "normal structure", while the structure in which the TFT substrate is disposed on the viewing surface side and the CF substrate is disposed on the back surface side is also referred to as the "inverted structure".

The liquid crystal display device 1 of the present embodiment is provided with the following features (1) to (3) for employment of the inverted structure. These features elimi-nate the disadvantages of the inverted structure, enabling the inverted structure to achieve better characteristics than the normal structure.

(1) The CF substrate 200 on the back surface side includes the reflective layer 221 disposed outside the pixel region 10AA (in a region 10NA outside the pixel region 10AA). This structure enables the reflective layer 221 to reflect light emitted from the backlight 50 and incident on a portion outside the pixel region 10AA toward the back surface, so that the light can be reused for display. With the reflective layer 221 utilized in the inverted structure, the use efficiency of the backlight illumination increases, and thus the inverted structure can achieve a higher luminance than the normal structure.

Meanwhile, in the inverted structure in which the TFT substrate 100 is disposed on the viewing surface side, the liquid crystal panel 10P may have a higher reflectance than the panel in the normal structure in an environment with external light L such as illumination light or sunlight. A larger amount of reflection of the external light L causes difficulty in perception of the transmissive display using the backlight illumination. The causes of the high reflectance of the liquid crystal panel in the inverted structure include the following causes (A) and (B).

(A) The metal lines having a high reflectance, such as the gate lines and source lines, are disposed outside the pixel region 10AA (non-opening portion), and these metal lines reflect the external light L.

(B) The inside of the pixel region 10AA (opening portion) has a multilayer structure, which causes multilayer film interference due to the difference between the interlayer refractive indexes. This may amplify the reflected light.

(2) The circularly polarizing plate 60 is disposed on the viewing surface side of the TFT substrate 100. The circularly polarizing plate 60 includes the first linearly polarizing plate 11 and the first λ/4 retardation layer 21. In other words, adding the first λ/4 retardation layer 21 to the first linearly polarizing plate 11 used in the normal structure produces the circularly polarizing plate 60. Disposing the circularly polarizing plate 60 on the viewing surface side surface of the liquid crystal panel 10p enables suppression of external light reflection by the TFT substrate 100 because the circularly polarizing plate 60 absorbs the reflected light due to the causes (A) and (B), if produced. Without the circularly polarizing plate 60, disposing a light-absorbing layer on the viewing surface side of metal lines such as gate lines 101 and source lines 102 of the TFT substrate 100 can suppress reflection due to the cause (A), but cannot suppress reflection due to the cause (B). In this respect, the present embodiment, employing the circularly polarizing plate 60 disposed on the viewing surface side of the TFT substrate 100, can suppress reflection due to the causes (A) and (B). The first λ/4 retardation layer 21 is also referred to as the "out-cell λ/4 retardation layer" since the first λ/4 retardation layer 21 is disposed closer to the viewing surface than the TFT substrate 100 is.

(3) The TFT substrate 100 disposed on the viewing surface side includes the second λ/4 retardation layer 22. The second λ/4 retardation layer 22 is also referred to as the "in-cell λ/4 retardation layer" since the second λ/4 retardation layer 22 is disposed closer to the back surface than the supporting substrate 110 defining the TFT substrate 100 is (disposed inside the liquid crystal panel 10P). The in-cell λ/4 retardation layer is disposed to prevent a failure in transmissive display to be provided by the fringe field switching (FFS) mode (failure in black display) due to the addition of the out-cell λ/4 retardation layer. The in-cell λ/4 retardation layer is preferably disposed between the pixel electrodes 170 (slit electrodes) and the first interlayer insulating film 140 in the TFT substrate 100.

The liquid crystal display device of the present embodiment having the features (2) and (3) combined can sufficiently suppress the increase in external light reflection in the liquid crystal panel having the inverted structure while being in the FFS mode excellent in the viewing angle characteristics. Thus, the liquid crystal display device can provide transmissive display favorable in the viewing angle characteristics and viewability under external light.

The liquid crystal display device of the present embodiment also can prevent external light reflection due to a cause other than the causes (A) and (B). The liquid crystal display device of the present embodiment may include additional components such as a shield electrode and touch panel driving lines used for a touch panel sensor between the out-cell $\lambda/4$ retardation layer and the TFT substrate 100, and the liquid crystal display device can also use the circularly polarizing plate 60 to suppress external light reflection by these additional components. Use of the shield electrode enables prevention of charging-related defects. Use of the touch panel sensor enables production of a high value-added, touch panel-incorporated liquid crystal panel 10P, thereby reducing the number of components in the liquid crystal display device 1. In order not to inhibit the in-cell $\lambda/4$ retardation layer from improving the display quality of the transmissive display, the additional components and the substrates for these additional components preferably provide no retardation.

Hereinbelow, the components of the liquid crystal display device of the present embodiment are described.

The circularly polarizing plate 60 includes the first linearly polarizing plate 11 and the first $\lambda/4$ retardation layer 21. Examples of the first linearly polarizing plate 11 include polarizers (absorptive polarizing plates) obtained by dyeing a polyvinyl alcohol (PVA) film with an anisotropic material such as an iodine complex (or a dye) to adsorb the material on the PVA film and stretch-aligning the material. Typically, in order to achieve a mechanical strength and moist heat resistance, each surface of the PVA film is laminated with a protective film such as a triacetyl cellulose (TAC) film for practical use.

The in-plane slow axis of the first $\lambda/4$ retardation layer 21 and the absorption axis of the first linearly polarizing plate 11 preferably form an angle of approximately 45°. In this case, the first $\lambda/4$ retardation layer 21 in combination with the first linearly polarizing plate 11 functions as the circularly polarizing plate 60. This structure enables reduction in internal reflection of the liquid crystal display device 1, suppressing external light reflection (glare). Thus, display with a high contrast ratio can be provided even in a bright environment with strong external light L.

Herein, the term "approximately 0°" refers to falling within the range of 0°±3°, preferably 0°±1°, more preferably 0°±0.5°, particularly preferably 0°. The term "approximately 45°" refers to falling within the range of 45°±3°, preferably 45°±1°, more preferably 45°±0.5°, particularly preferably 45°. The term "approximately 90°" refers to falling within the range of 90°±3°, preferably 90°±1°, more preferably 90°±0.5°, particularly preferably 90°.

The first $\lambda/4$ retardation layer 21 may be formed from any material. Since the first $\lambda/4$ retardation layer 21 can be attached to the TFT substrate 100, a stretched polymer film (retardation film) typically used in the field of liquid crystal display devices is suitable. The polymer film may be formed from, for example, a cycloolefin polymer, polycarbonate, polysulfone, polyethersulfone, polyethylene terephthalate, polyethylene, polyvinyl alcohol, norbornene, triacetyl cellulose, or diacetyl cellulose. In particular, a cycloolefin polymer is preferred. A retardation layer formed from a cycloolefin polymer has advantages including excellent durability and a small change in retardation after long-term exposure to a high-temperature environment or high-temperature, high-humidity environment.

As with the later-described second $\lambda/4$ retardation layer 22, the first $\lambda/4$ retardation layer 21 can also be formed from a photo-polymerizable liquid crystal material. The first $\lambda/4$ retardation layer 21 can be formed from a photo-polymerizable liquid crystal material by a method including coating a flat base film such as a PET film with a photo-polymerizable liquid crystal material to form a film, transferring the obtained film to the first linearly polarizing plate 11 or the TFT substrate 100 via an adhesive or a pressure-sensitive adhesive, and ultimately peeling the base film, or by a method including directly coating the outer side (the surface on the viewing surface side) of the TFT substrate 100 with a photo-polymerizable liquid crystal material to form a film.

The TFT substrate 100 includes thin-film transistors 104, which are switching elements used to turn on or off the respective pixels of the liquid crystal display device 1. In the present embodiment, the configuration of the TFT substrate 100 for the FFS mode is described. However, the features (1) to (3) are applicable to the inverted structures in the other transverse electric field modes. For example, the features may be applied to the inverted structure in the in-plane-switching (IPS) mode.

As shown in FIG. 3, the TFT substrate 100 includes the TFTs 104, and includes, sequentially from the viewing surface side to the back surface side, the supporting substrate 110, the gate lines 101 as an example of the metal lines, the gate insulator 120, the source lines 102 as an example of the metal lines, the first interlayer insulating film 140, the second $\lambda/4$ retardation layer 22, a common electrode 150, the second interlayer insulating film 160, and the pixel electrodes 170. This structure enables generation of transverse electric fields (fringe electric fields) in the liquid crystal layer 40 by applying voltage between the common electrode 150 and the pixel electrodes 170 which form a pair of electrodes. Thus, adjusting the voltage to be applied between the common electrode 150 and the pixel electrodes 170 enables control of the alignment of liquid crystals in the liquid crystal layer 40. In the present embodiment, the gate lines 101 and the source lines 102 disposed on the viewing surface side of the paired electrodes (common electrode 150 and pixel electrodes 170) are described as examples of the metal lines. However, the positional relationship between the metal lines and the pair of electrodes is not limited to the relationship above. The metal lines may be disposed on the back surface side of the paired electrodes.

The TFT substrate 100 includes, on the supporting substrate 110, the gate lines 101 parallel to each other and the source lines 102 parallel to each other and intersecting the gate lines 101 via the gate insulator 120. The gate lines 101 and the source lines 102 are formed in a grid pattern to define the pixels. At the respective intersections of the gate lines 101 and the source lines 102 are disposed the TFTs 104 serving as switching elements.

Each TFT 104 is a three-terminal switch containing a gate electrode 101G connected to a corresponding gate line 101 and protruding from the corresponding gate line 101 (being part of the gate line 101), a source electrode 102S connected to a corresponding source line 102 and protruding from the corresponding source line 102 (being part of the source line 102), a drain electrode 102D connected to a corresponding pixel electrode 170, and a thin-film semiconductor layer 103. The source electrode 102S and the drain electrode 102D are disposed in the source line layer 130 as with the source lines 102. The gate electrode 101G is disposed in a gate line layer as with the gate lines 101. Each pixel electrode 170 is connected to the corresponding drain electrode 102D via a contact hole 104CH provided through the second interlayer insulating film 160, the second λ/4 retardation layer 22, and the first interlayer insulating film 140.

The thin-film semiconductor layer 103 of each TFT 104 is composed of, for example, a high resistive semiconductor layer made of a material such as amorphous silicon or polysilicon, and a low resistive semiconductor layer made of a material such as n+ amorphous silicon, which is amorphous silicon doped with an impurity such as phosphorus. The thin-film semiconductor layer 103 may be an oxide semiconductor layer made of zinc oxide, for example.

The supporting substrate 110 is preferably a transparent substrate such as a glass substrate or a plastic substrate.

The gate insulator 120 is, for example, an inorganic insulating film. The inorganic insulating film can be, for example, an inorganic film (relative permittivity ε=5 to 7) made of silicon nitride (SiNx) or silicon oxide (SiO$_2$), or a multilayer film including such films.

The gate line layer and the source line layer 130 each are a single or multiple layers of, for example, a metal such as copper, titanium, aluminum, molybdenum, or tungsten or an alloy thereof. The conductive lines such as the gate lines 101 and the source lines 102 and the electrodes defining the TFTs 104 can each be formed by forming a single or multiple layers of a metal such as copper, titanium, aluminum, molybdenum, or tungsten or an alloy thereof by a technique such as sputtering, and patterning the layer(s) by a technique such as photolithography. Production of these conductive lines and electrodes can be made efficient by using the same material for the conductive lines and the electrodes to be formed in the same layer.

The first interlayer insulating film 140 and the second interlayer insulating film 160 each are an inorganic insulating film, for example. The inorganic insulating film can be, for example, an inorganic film (relative permittivity ε=5 to 7) made of silicon nitride (SiNx) or silicon oxide (SiO$_2$), or a multilayer film including such films.

The common electrode 150 is formed on substantially the entire surface regardless of the boundaries of the pixels, except for certain portions such as the connection portions (contact holes 104CH) between the pixel electrodes 170 and the drain electrodes 102D. To the common electrode 150 are supplied common signals of a constant value, such that the common electrode 150 is maintained at a constant electric potential.

Each pixel electrode 170 is disposed in the corresponding region surrounded by adjacent two gate lines 101 and adjacent two source lines 102. The pixel electrode 170 is electrically connected to the corresponding source line 102 via the thin-film semiconductor layer 103 of the corresponding TFT 104. The pixel electrode 170 is set at an electric potential corresponding to the data signal supplied via the corresponding TFT 104.

The pixel electrode 170 is provided with parallel slits 170S. The slits 170S are inclined from the initial alignment azimuth of the liquid crystal molecules. Providing the slits 170S in the pixel electrodes 170 at an angle from the initial alignment azimuth of the liquid crystal molecules enables the liquid crystal molecules to rotate in a certain direction, and enables control of the alignment of liquid crystal molecules by voltage control.

The common electrode 150 and the pixel electrodes 170 may be formed from, for example, indium tin oxide (ITO) or indium zinc oxide (IZO).

The second λ/4 retardation layer (in-cell λ/4 retardation layer) 22 is used in combination with the first λ/4 retardation layer 21. In other words, a circularly polarizing, transverse electric field mode liquid crystal display device incorporating the first λ/4 retardation layer 21 alone cannot provide black display. Thus, the second λ/4 retardation layer 22 is used to optically compensate for the first λ/4 retardation layer 21, producing a state where both of the retardation layers are optically substantially absent. The resulting configuration is optically equivalent to that of a conventional transverse electric field mode liquid crystal display device providing no circular polarization, and thus can provide black display. Therefore, the retardations and the axial arrangement of the first λ/4 retardation layer 21 and the second λ/4 retardation layer 22 are preferably designed such that the layers cancel out each other's retardation provided to the light emitted from the backlight 50 and incident on the liquid crystal panel 10P. Also, the in-plane slow axis of the first λ/4 retardation layer 21 and the in-plane slow axis of the second λ/4 retardation layer 22 preferably form an angle of approximately 90°. In order to allow the retardation layers to exert their function, the in-plane slow axis of the first λ/4 retardation layer 21 and the in-plane slow axis of the second λ/4 retardation layer 22 preferably form an angle of approximately 45° with the absorption axis of the first linearly polarizing plate 11 and the absorption axis of the second linearly polarizing plate 12. In other words, given that the azimuth of the absorption axis of the first linearly polarizing plate 11 is 0°, preferably, one of the in-plane slow axis of the first λ/4 retardation layer 21 and the in-plane slow axis of the second λ/4 retardation layer 22 is at an azimuth of 45°, and the other is at an azimuth of 135°. For example, preferably, the in-plane slow axis of the first λ/4 retardation layer 21 is at an azimuth of 45°, and the in-plane slow axis of the second λ/4 retardation layer 22 is at an azimuth of 135°. Here, the azimuth is of a positive angle when measured in the counterclockwise direction, while the azimuth is of a negative angle when measured in the clockwise direction. Both of the counterclockwise direction and the clockwise direction are the directions when the screen is viewed from the viewing surface side (front surface).

Preferred exemplary arrangement of the optical axes in the present embodiment is shown in FIG. 3. Here, the absorption axis of the first linearly polarizing plate 11 is at an azimuth of 0°, the in-plane slow axis of the first λ/4 retardation layer 21 is at an azimuth of 45°, the in-plane slow axis of the second λ/4 retardation layer 22 is at an azimuth of)−45° (135°, the initial alignment direction (slow axis) of the liquid crystal molecules in the liquid crystal layer 40 is at an azimuth of 0°, and the absorption axis of the second linearly polarizing plate 12 is at an azimuth of 90°. In the present embodiment, the case is described where the liquid crystal layer 40 contains negative liquid crystals. In the case where the liquid crystal layer 40 contains positive liquid crystals, the initial alignment direction of the liquid crystal molecules is preferably at an azimuth of 90°.

The second λ/4 retardation layer 22 is preferably formed from a cured product of a photo-polymerizable liquid crystal material (also referred to as a "reactive mesogen"). With the photo-polymerizable liquid crystal material, the second λ/4 retardation layer 22 can be formed by coating during the production process of the TFT substrate 100, so that the liquid crystal display device 1 can be reduced in thickness.

The process of forming the second λ/4 retardation layer 22 is described in detail. The second λ/4 retardation layer 22 is formed by coating with the photo-polymerizable liquid crystal material (reactive mesogen) and curing the material. The photo-polymerizable liquid crystal material may be a liquid crystal polymer (liquid crystalline polymer) having a photoreactive group. Examples of the photo-polymerizable liquid crystal material include polymers having a substituent (mesogen group) such as a biphenyl group, a terphenyl group, a naphthalene group, a phenyl benzoate group, an azobenzene group, or a derivative thereof, and a photoreactive group such as a cinnamoyl group, a chalcone group, a cinnamylidene group, a β-(2-phenyl)acryloyl group, a cinnamic acid group, or a derivative thereof together in a side chain(s), and a structure derived from a compound such as acrylate, methacrylate, maleimide, N-phenyl maleimide, or siloxane in the main chain. The polymer may be a homopolymer containing only a single type of repeat unit, or may be a copolymer containing two or more types of repeat units with different side chain structures. The "copolymer" includes copolymers such as alternating copolymers, random copolymers, and graft copolymers. In each copolymer, a side chain of at least one repeat unit has the mesogen group and the photoreactive group together, but a side chain of another repeat unit may contain no mesogen group or no photoreactive group.

The photo-polymerizable liquid crystal material may contain an additive such as a photopolymerization initiator. The photopolymerization initiator may be any conventionally used one.

Examples of the solvent used for coating with the photo-polymerizable liquid crystal material include toluene, ethylbenzene, ethylene glycol monomethyl ether, ethylene glycol dimethyl ether, propylene glycol methyl ether, dibutyl ether, acetone, methyl ethyl ketone, ethanol, propanol, cyclohexane, cyclopentanone, methylcyclohexane, tetrahydrofuran, dioxane, cyclohexanone, n-hexane, ethyl acetate, butyl acetate, propylene glycol methyl ether acetate, methoxybutyl acetate, N-methylpyrrolidone, and dimethylacetamide. These may be used alone or in combination with each other.

The second λ/4 retardation layer 22 can be formed from a photo-polymerizable liquid crystal material by, for example, the following method. A base alignment film is formed on the first interlayer insulating film 140, and is subjected to an alignment treatment such as rubbing or photoirradiation for alignment azimuth determination. The base alignment film having been subjected to the alignment treatment is coated with a photo-polymerizable liquid crystal material, which is then cured by a method such as baking or photoirradiation. The coating with a photo-polymerizable liquid crystal material can be performed suitably with an applicator such as a slit coater or a spin coater. The coating with the material is performed to give a uniform thickness, and the material is pre-baked at about 70° C. to 100° C. for two minutes. The material is then subjected to photocuring using an exposure device emitting light (ultraviolet light) having a wavelength of 313 to 365 nm. The baking temperature and photocuring conditions may be adjusted as appropriate according to the photo-polymerizable liquid crystal material, and are not limited to the above conditions.

The molecules of the cured photo-polymerizable liquid crystal material are aligned at the alignment azimuth provided by the base alignment film, so that the material functions as a retardation layer. The retardation provided by the retardation layer is typically determined as a product of the birefringence Δn of the photo-polymerizable liquid crystal material and the thickness d of the retardation layer.

In the case where the photo-polymerizable liquid crystal material itself is a material inducing the alignment by a method such as polarized ultraviolet light application, the formation of a base alignment film can be omitted.

The first alignment film 31 and the second alignment film 32 have a function to control the alignment of liquid crystal molecules contained in the liquid crystal layer 40. When the voltage applied to the liquid crystal layer 40 is less than the threshold voltage (including the case of no voltage application), the first alignment film 31 and the second alignment film 32 mainly function to control the long axes of the liquid crystal molecules in the liquid crystal layer 40 to be oriented to the direction parallel to the first alignment film 31 and the second alignment film 32.

The expression "the long axes of the liquid crystal molecules in the liquid crystal layer 40 are oriented to the direction parallel to the first alignment film 31 and the second alignment film 32" means that the tilt angle (including the pre-tilt angle) of the liquid crystal molecules is 0° to 5°, more preferably 0° to 3°, still more preferably 0° to 1°, relative to the first alignment film 31 and the second alignment film 32. The tilt angle of the liquid crystal molecules means the angle of inclination of the long axes (optical axes) of the liquid crystal molecules from the surfaces of the first polarizing plate and the second polarizing plate.

The first alignment film 31 and the second alignment film 32 are layers on which the alignment treatment to control the alignment of liquid crystal molecules was performed. These alignment films can be common alignment films used in the field of liquid crystal display devices, such as a polyimide. The first alignment film 31 and the second alignment film 32 may be formed from, for example, a polymer whose main chain is derived from a polyimide, a polyamic acid, or a polysiloxane. Preferred is a photoalignment film material having a photoreactive site (functional group) in its main chain or side chain.

The liquid crystal layer 40 contains liquid crystal molecules aligned parallel to the TFT substrate 100 in the no-voltage-applied state. The alignment of the liquid crystal molecules varies in response to the voltage applied between the paired electrodes, i.e., the common electrode 150 and the pixel electrodes 170, so that the transmission amount of light is controlled. The liquid crystal molecules in the liquid crystal layer 40 are horizontally aligned by the control force of the first alignment film 31 and the second alignment film 32 when no voltage is applied between the paired electrodes (no-voltage-applied state) in the TFT substrate 100. The liquid crystal molecules rotate in an in-plane direction in response to the transverse electric fields generated in the liquid crystal layer 40 when voltage is applied between the paired electrodes (voltage-applied state).

The anisotropy of dielectric constant (Δε) of the liquid crystal molecules defined by the following formula may be positive or negative. The Δε of the liquid crystal molecules in the liquid crystal layer 40 in the present embodiment is negative. Liquid crystal molecules having a positive anisotropy of dielectric constant are also referred to as positive liquid crystals, while liquid crystal molecules having a negative anisotropy of dielectric constant are also referred to as negative liquid crystals. The long axis direction of the liquid crystal molecules is the slow axis direction.

Δε=(dielectric constant of liquid crystal molecules in long axis direction)−(dielectric constant of liquid crystal molecules in short axis direction)

When the liquid crystal layer 40 contains negative liquid crystals, the slow axis of the liquid crystal layer 40 preferably forms an angle of approximately 0' with the absorption axis of the first linearly polarizing plate 11. When the liquid crystal layer 40 contains positive liquid crystals, the slow axis of the liquid crystal layer 40 preferably forms an angle of approximately 90° with the absorption axis of the first linearly polarizing plate 11.

The CF substrate 200 includes, sequentially from the back surface side to the viewing surface side, the supporting substrate 210, a black matrix layer 220, the CF layer 230, and the overcoat layer 240.

The supporting substrate 210 is preferably a transparent substrate such as a glass substrate or a plastic substrate.

The black matrix layer 220 is disposed on the supporting substrate 210 in a grid pattern corresponding to the gate lines 101 and the source lines 102, and is disposed outside the pixel region.

The black matrix layer 220 includes the reflective layer 221 defining the surface on the back surface side and the black film 222 defining the surface on the viewing surface side. The black matrix layer 220 may include another layer between the reflective layer 221 and the black film 222.

The reflective layer 221 may be any layer that reflects incident light from the backlight 50 toward the back surface side, and is preferably a layer formed from a material whose reflectance of light from the backlight 50 is higher than its absorbance of the light. Examples thereof include reflective metal layers. Examples of the reflective metal layers include metal single-layer films, dielectric multilayer films (high reflective films) including a laminate of a high refractive index layer such as a $Ta_2O_3$ film and a low refractive index layer such as a $MgF_2$ layer, and laminates of a metal single-layer film(s) and a high reflective film(s). The metal is preferably a high reflective metal. Examples of the high reflective metal include Al and Ag. The reflective layer 221 can be formed into the black matrix pattern by, for example, forming a high reflective film on the supporting substrate 210 with a sputtering device or any other device, and then etching the film.

The reflective layer 221 may be a reflective layer containing cholesteric liquid crystals. The reflective layer containing cholesteric liquid crystals can be produced by the following method, for example. First, an alignment film is formed on the supporting substrate 210, and the alignment film is subjected to photoalignment treatment. The alignment film is coated with a polymerizable solution, which is then dried into a coating film. The portion other than the black matrix pattern is masked. The film is irradiated with ultraviolet light and then baked. Subsequently, the portion other than the black matrix pattern is masked. The film is further irradiated with ultraviolet light, developed, and dried. Thereby, the black matrix pattern of the reflective layer 221 containing cholesteric liquid crystals can be formed.

The polymerizable solution may contain, for example, a polymerizable liquid crystal compound, a chiral agent, a polymerization initiator, and a solvent. In order to control the surface tension of the coating film obtained by coating with the polymerizable solution, a surfactant may be further added.

The polymerizable liquid crystal compound preferably has a birefringence Δn (=ne-no) of 0.18 or higher, for example. The birefringence of the polymerizable liquid crystal compound is more preferably 0.18 to 0.40, still more preferably 0.18 to 0.22. The birefringence Δn can be measured by the Senarmont method.

The reflective layer 221 containing cholesteric liquid crystals may be a laminate of two or more layers that reflect light rays having different wavelengths, such as a laminate of, for example, a layer that reflects red light, a layer that reflects green light, and a layer that reflects blue light. When the reflective layer 221 is a reflective layer containing cholesteric liquid crystals, the light to be incident on the reflective layer containing cholesteric liquid crystals is preferably circularly polarized light, and a circularly polarizing plate is preferably disposed closer to the backlight than the reflective layer 221 is.

The CF substrate 200 of the present embodiment includes the black film 222 disposed on the viewing surface side of the reflective layer 221. This mode enables suppression of reflection of external light L incident on the viewing surface side by the reflective layer 221, further suppressing external light reflection. Also, since the external light L incident on the viewing surface side is absorbed by the black film 222, the external light L can be prevented from being reflected toward the TFTs 104. This structure can suppress generation of light leakage current and increase the contrast ratio of the display screen to achieve favorable image quality.

Preferably, the black film 222 is formed from a material whose absorbance of the external light L incident on the viewing surface side is higher than its reflectance of the external light L, and the black film 222 has an absorbance of the external light L of 80% or higher. Examples of the black film 222 include oxide metal films and resin films. Examples of the oxide metal films include two-layer films of chromium (Cr) and chromium oxide (CrOx). Examples of the resin films include black resists. Preferred examples of the black resists include black photosensitive resins such as a black photosensitive acrylic resin.

The CF layer 230 includes red color filters 230R, green color filters 230G, and blue color filters 230B in a plane and partitioned by the black matrix layer 220. The red color filters 230R, the green color filters 230G, and the blue color filters 230B each are, for example, formed from a transparent resin containing a pigment. Typically, a red color filter 230R, a green color filter 230G, and a blue color filter 230B in combination are arranged in each and every pixel, and the desired color can be produced for the pixel by mixing colored lights transmitted through the red color filter 230R, the green color filter 230G, and the blue color filter 230B while controlling the amounts of the colored lights. The red color filters 230R, the green color filters 230G, and the blue color filters 230B may not have the same thickness. In other words, the liquid crystal layer 40 side surface of the CF layer 230 may not be flat.

The overcoat layer 240 functions to flatten the liquid crystal layer 40 side surface of the CF substrate 200, and can be, for example, an organic film (permittivity ε=3 to 4). The overcoat layer 240 is formed through coating with a photocurable resin, ultraviolet irradiation, and baking, for example.

The overcoat layer 240 covers the liquid crystal layer 40 side surface of the CF layer 230. The overcoat layer 240 functions to flatten the base of the second alignment film 32 when the liquid crystal layer 40 side surface of the CF layer 230 is not flat. The overcoat layer 240 can also prevent impurities in the CF layer 230 from dissolving to the liquid crystal layer 40 side. The overcoat layer 240 is preferably formed from a photocurable or heat-curable transparent resin. A photocurable transparent resin is used in combination with, for example, a photopolymerization initiator, an additive, and/or a solvent. The overcoat layer 240 has a thickness of, for example, 0.5 to 2.0 µm, preferably 0.8 to 1.2 µm.

The shield electrode 300 functions to block electromagnetic waves and static electricity. The shield electrode 300 is a conductive film and is connected to the ground terminal of the liquid crystal panel driving circuit. This mode enables the shield electrode 300 to be set at the reference potential of the liquid crystal panel driving circuit (ground potential of the TFT substrate 100) to block electromagnetic waves and static electricity. The shield electrode 300 is preferably a transparent conductive film, such as a transparent conductive film of ITO, IZO, or ZnO, for example.

When the liquid crystal display device 1 does not include the shield electrode 300, the reflective layer 221 is preferably connected to the ground terminal of the liquid crystal panel driving circuit. This mode also enables the reflective layer 221 to be set at the reference potential of the liquid crystal panel driving circuit (ground potential of the TFT substrate 100) to block electromagnetic waves and static electricity.

When the reflective layer 221 is connected to the ground terminal, the liquid crystal layer 40 preferably contains negative liquid crystals. This mode enables an increase in transmittance as compared with a mode where the liquid crystal layer 40 contains positive liquid crystals. When the reflective layer 221 is connected to the ground terminal, vertical electric fields are generated in the liquid crystal layer 40 in response to driving of the liquid crystal panel 10P. Here, the positive liquid crystals tend to align vertically, which may decrease the transmittance.

The liquid crystal panel driving circuit includes a gate driver that supplies scanning signals to the gate lines 101 and a source driver (the later-described driver 10D) that supplies data signals to the source lines 102.

The second linearly polarizing plate 12 can be, for example, a polarizer (absorptive polarizing plate) obtained by dyeing a polyvinyl alcohol (PVA) film with an anisotropic material such as an iodine complex (or a dye) to adsorb the material on the PVA film and stretch-aligning the material. Typically, in order to achieve a mechanical strength and moist heat resistance, each surface of the PVA film is laminated with a protective film such as a triacetyl cellulose (TAC) film for practical use.

The first linearly polarizing plate 11 and the second linearly polarizing plate 12 are preferably disposed such that their absorption axes are perpendicular to each other. The first linearly polarizing plate 11 and the second linearly polarizing plate 12 in this structure are disposed in crossed Nicols, and thereby can achieve favorable black display in the no-voltage-applied state. Hereinafter, description is made based on the definition that the absorption axis of the first polarizing plate 11 is defined to be at an azimuth of 0°. Here, the absorption axis of the second polarizing plate 12 is preferably at an azimuth of 90°.

Herein, the state where two axes (directions) are "perpendicular to each other" means that they form an angle (absolute value) falling within the range of 90°±3°, more preferably 90°±1°, still more preferably 90°±0.5°, particularly preferably 90° (perfectly perpendicular to each other). Also herein, the state where two axis (directions) are "parallel to each other" means that they form an angle (absolute value) falling within the range of 0°±3°, preferably 0°±1°, more preferably 0°±0.5°, particularly preferably 0° (perfectly parallel to each other).

The reflective polarizing plate 13 can be, for example, a multilayer reflective polarizing plate, a nanowire grid polarizing plate, or a reflective polarizing plate using selective reflection of cholesteric liquid crystals. Examples of the multilayer reflective polarizing plate include the reflective polarizing plate (trade name: DBEF) available from 3M Japan Limited. Examples of the nanowire grid polarizing plate include those disclosed in JP 2006-201782 A and JP 2005-195824 A. Examples of the reflective polarizing plate using selective reflection of cholesteric liquid crystals include a reflective polarizing plate (trade name: PCF) available from Nitto Denko Corporation. The reflective polarizing plate 13 can be disposed such that its reflection axis is at an azimuth of 90°.

The backlight 50 may be any backlight that irradiates the liquid crystal panel 10P with light, and may be a direct-lit backlight, an edge-lit backlight, or a backlight of any other type. The backlight 50 of the present embodiment is an edge-lit backlight and may have a structure including, as shown in FIG. 3, a light source 51, a light guide plate 52, and a reflector 53. The light guide plate 52 may be one usually used in the field of liquid crystal display devices. The backlight 50 may further include an optical sheet(s) such as a diffuser and/or a prism sheet as appropriate.

The light source 51 may be any light source that emits light including visible light, and may be one that emits light including only visible light or one that emits light including both visible light and ultraviolet light. In order to enable color display by the liquid crystal display device 1, a light source that emits white light is suitable. Suitable types of the light source 51 include, for example, cold cathode fluorescent lamps (CCFLs) and light emitting diodes (LEDs). Herein, the term "visible light" means light (electromagnetic waves) having a wavelength of 380 nm or longer and shorter than 800 nm.

The reflector 53 may be any reflector that can reflect recycled light, which was emitted from the light source 51 and reflected by the reflective layer 221, toward the liquid crystal layer 40 again. In particular, an Al reflector is suitable which produces reflected light having a high specular reflection content (high specular glossiness) as the AL reflector can reflect recycled light back toward the liquid crystal layer 40 while maintaining the polarization of the recycled light reflected by the reflective layer 221. If the surface of the reflector 53 is uneven, the light emitted by the light source 51 is diffused by the surface of the reflector 53 and thus depolarized. This increases the amount of light absorbed by the second linearly polarizing plate 12, leading to a low recycling effect. Here, the back surface of the light guide plate 52 may be provided with a reflection function such that the light guide plate 52 functions as both a light guide plate and a reflector.

The liquid crystal display device 1 of the present embodiment includes, in addition to the liquid crystal panel 10P and the backlight 50, components including: external circuits such as a tape carrier package (TCP) and a printed-circuit board (PCB); optical films such as a viewing angle widening film and a luminance improving film; and a bezel (frame), and such a component may be incorporated in another component depending on the type of the component. Components other than the components described above are not limited, and those usually used in the field of liquid crystal display devices can be used. Thus, the description thereof is omitted.

The present invention is further described in detail below based on examples and comparative examples. The present invention is not limited to these examples.

Example 1

A liquid crystal display device 1 of Example 1 having the same configuration as the liquid crystal display device 1 of the embodiment shown in FIGS. 1 to 4 was produced. The liquid crystal driving mode was the FFS mode. The gate insulator 120 was a SiO$_2$ inorganic insulating film. The source line layer 130 was a laminate of a copper film and a titanium film. The first interlayer insulating film 140 was a SiO$_2$ inorganic insulating film. The second interlayer insulating film 160 was a SiNx inorganic insulating film. The common electrode 150 and the pixel electrodes 170 each were an ITO film. The first λ/4 retardation layer 21 and the second λ/4 retardation layer 22 each were a λ/4 retardation layer formed using a photo-alignment film and photo-polymerizable liquid crystals. The reflective layer 221 was an Al layer. The black film 222 was a black resist. The width of the reflective layer 221 was the same as that of the black film 222. The reflective layer 221 was superimposed with the black film 222. The liquid crystal layer 40 contained negative liquid crystals and had a Δn of 0.105. The overcoat layer 240 was an acrylic resin film. The shield electrode 300 was an ITO film and connected to the ground terminal of the liquid crystal panel driving circuit via a silver paste.

The width of the black matrix layer 220 was 7 µm. The cell gap of the liquid crystal layer 40 was 3 µm. The width of each source line 102 was 4 µm. The ratio L/S of the width L of each pixel electrode 170 and the width S of each slit was 2.7 µm/4.3 µm. The width of each sub-pixel provided with a single pixel electrode 170 was 58 µm.

Example 2

Figure 5:
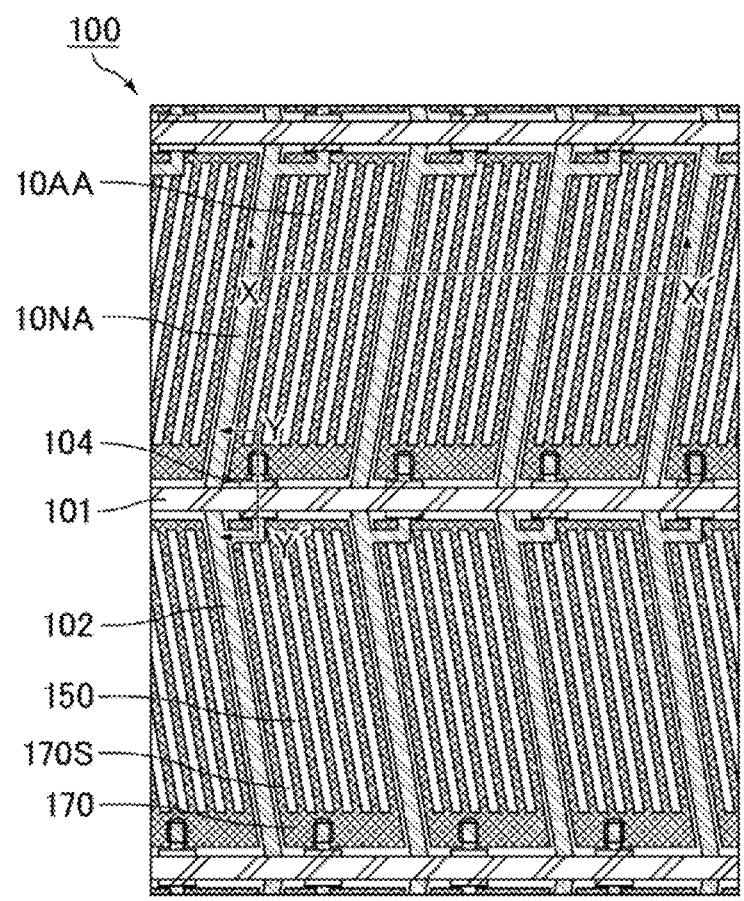
FIG. 5 is a schematic plan view showing the pixel configuration of a viewing surface side substrate (TFT substrate) included in a liquid crystal display device of Example 2.
Figure 6:
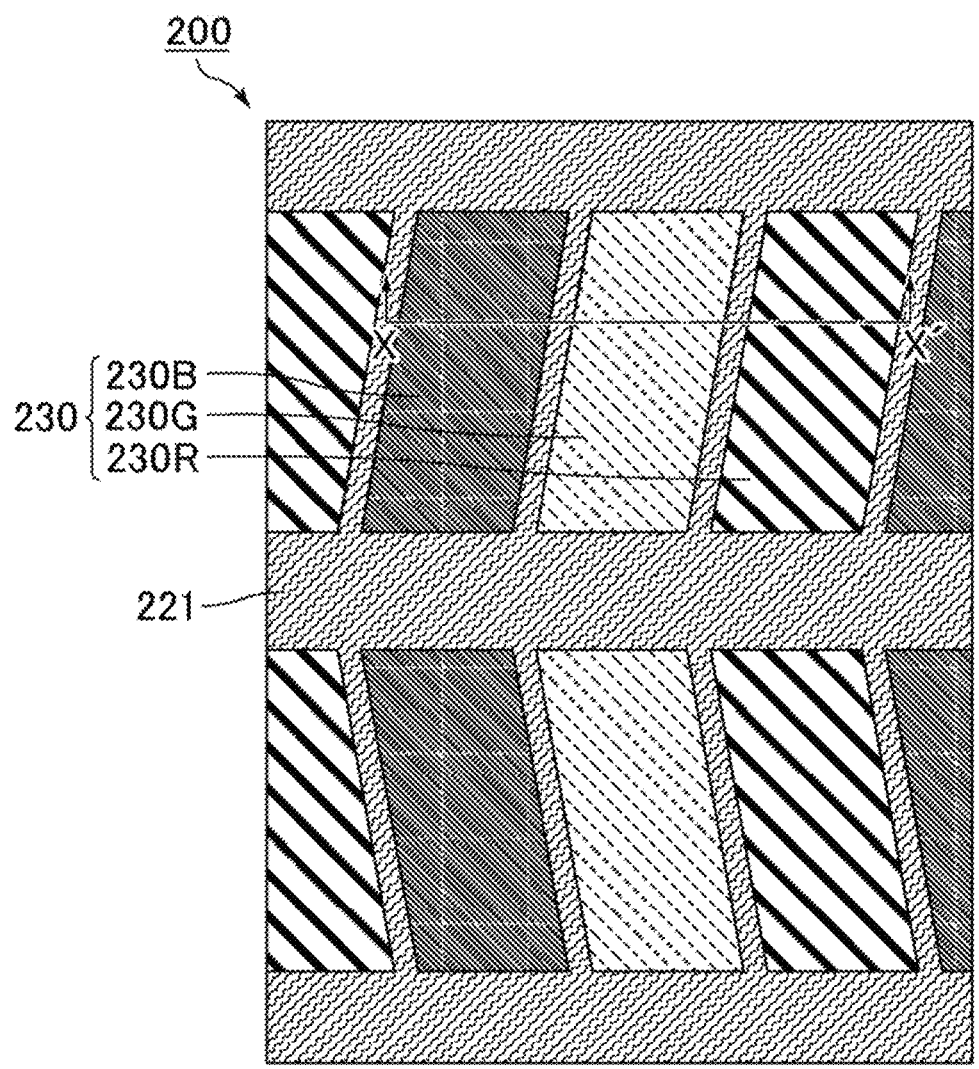
FIG. 6 is a schematic plan view showing the pixel configuration of a back surface side substrate (CF substrate) included in the liquid crystal display device of Example 2.
Figure 7:
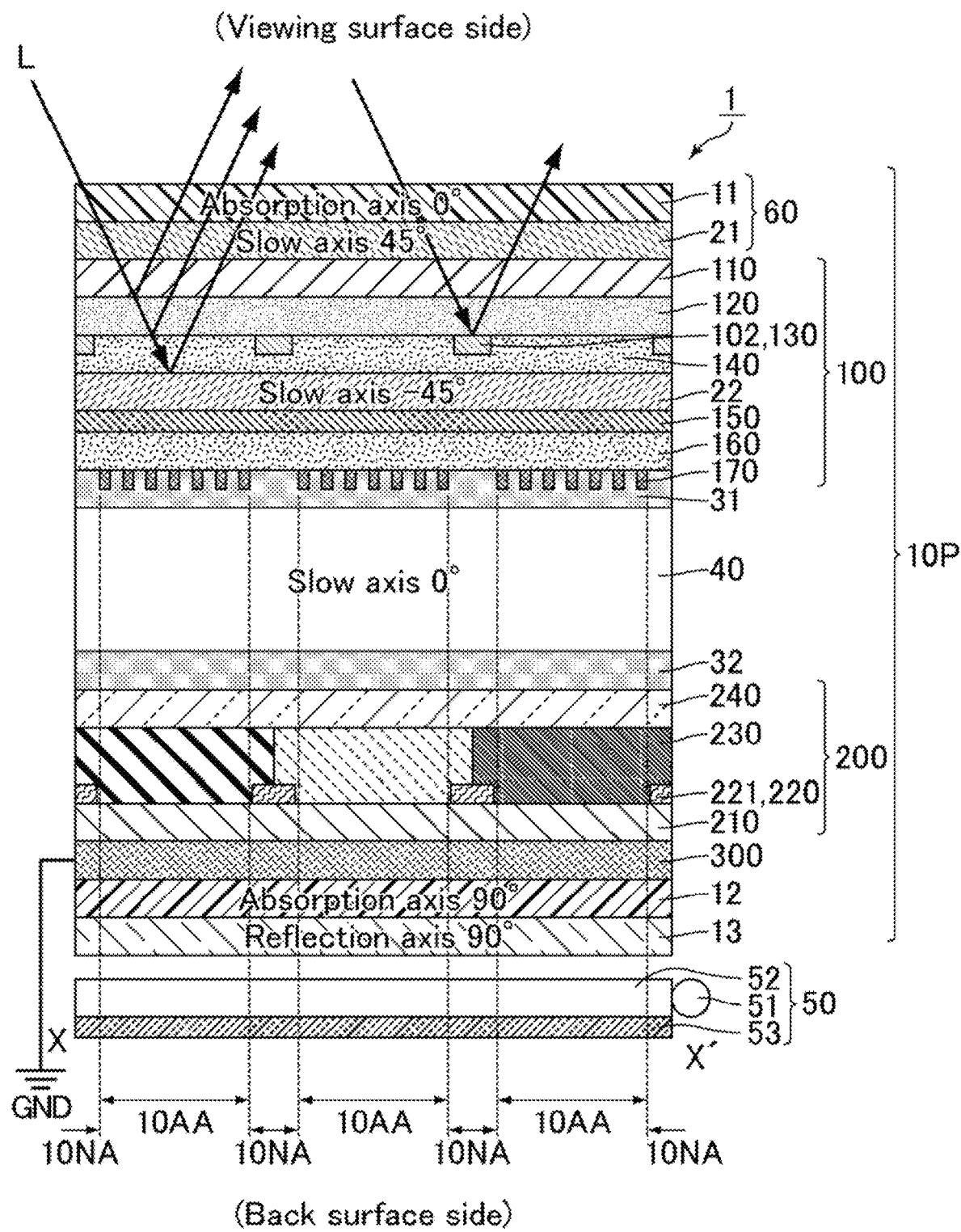
FIG. 7 is a schematic cross-sectional view of the liquid crystal display device of Example 2 taken along the X-X' line in FIGS. 6 and 7.

FIG. 5 is a schematic plan view showing the pixel configuration of a viewing surface side substrate (TFT substrate) included in a liquid crystal display device of Example 2. FIG. 6 is a schematic plan view showing the pixel configuration of a back surface side substrate (CF substrate) included in the liquid crystal display device of Example 2. FIG. 7 is a schematic cross-sectional view of the liquid crystal display device of Example 2 taken along the X-X' line in FIGS. 6 and 7. FIG. 5 and FIG. 6 each are a schematic plan view from the viewing surface side. The schematic cross-sectional view of the liquid crystal display device of Example 2 taken along the Y-Y' line in FIG. 5 is similar to that in FIG. 4.

A liquid crystal display device 1 of Example 2 shown in FIG. 5 to FIG. 7 and FIG. 4 was produced. The liquid crystal display device 1 of Example 2 had the same configuration as the liquid crystal display device 1 of Example 1, except that it did not include the black film 222.

Example 3

Figure 8:
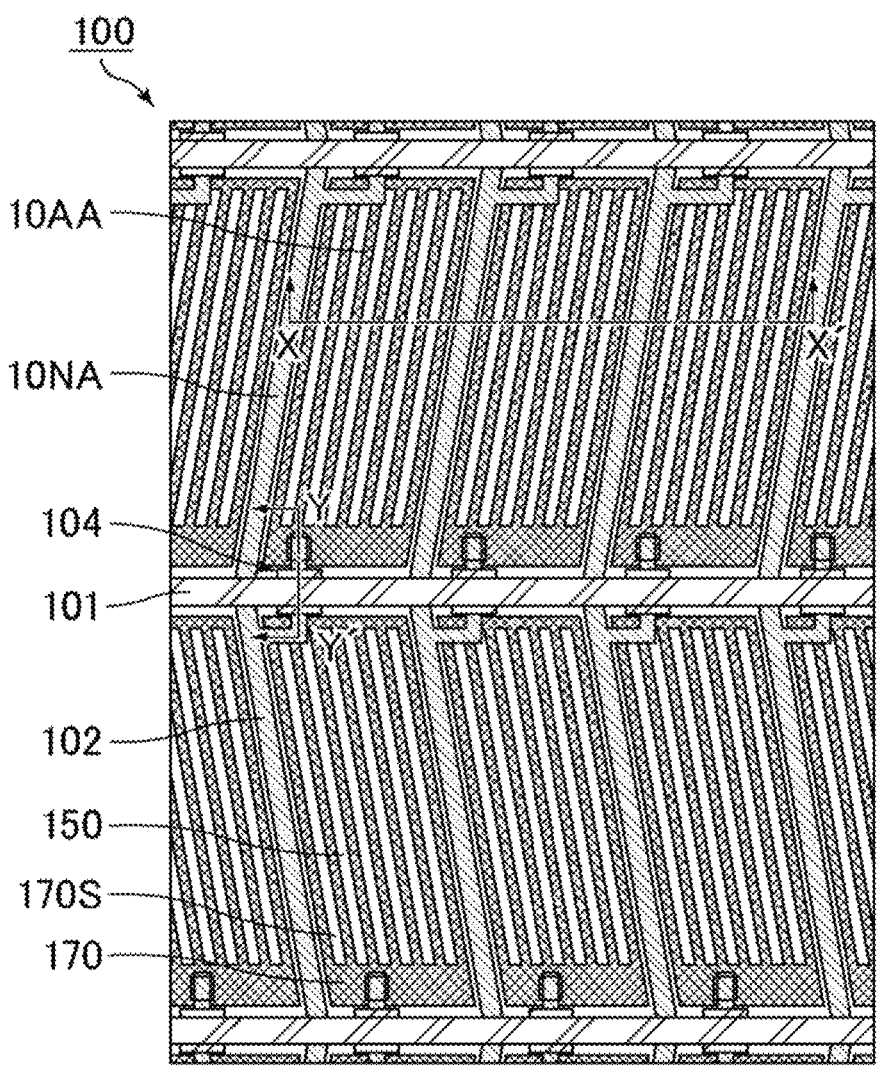
FIG. 8 is a schematic plan view showing the pixel configuration of a viewing surface side substrate (TFT substrate) of a liquid crystal display device of Example 3.
Figure 9:
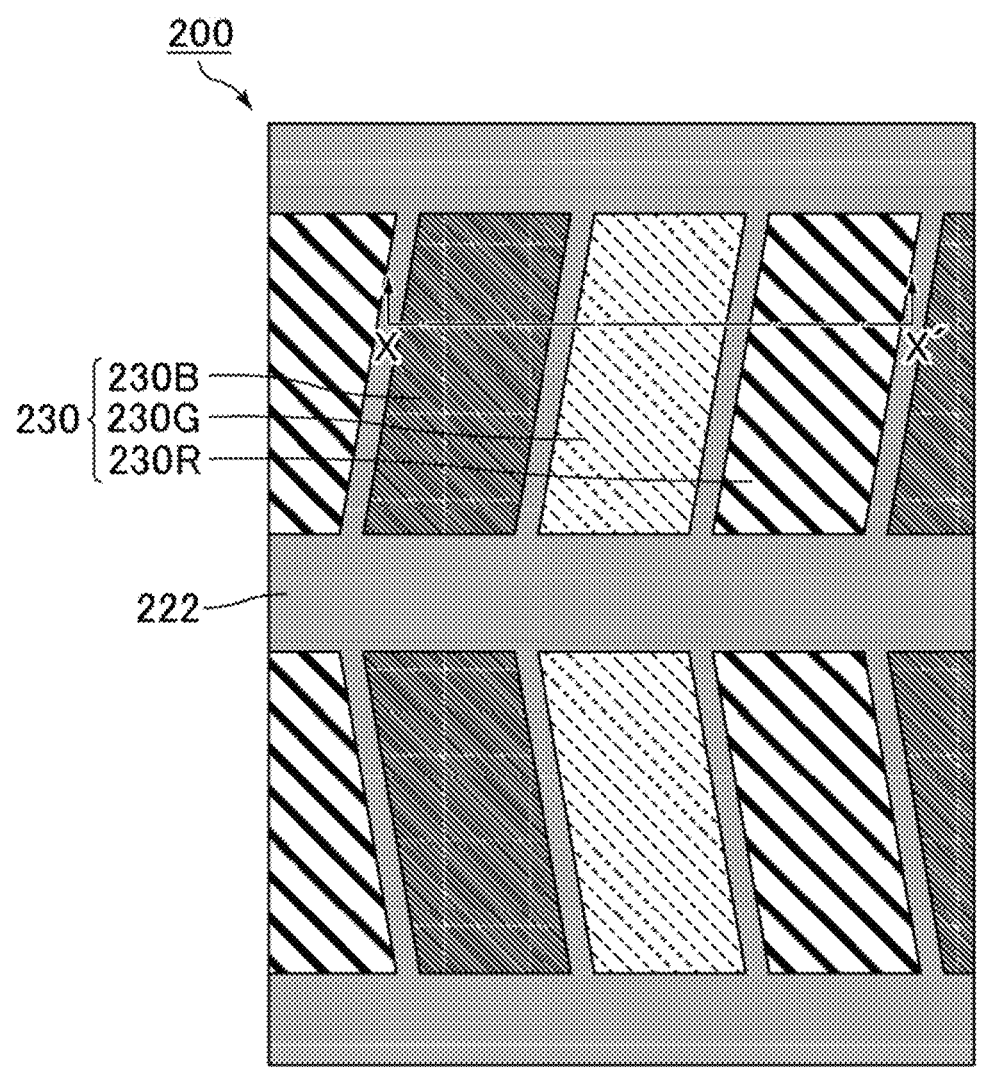
FIG. 9 is a schematic plan view showing the pixel configuration of a back surface side substrate (CF substrate) included in the liquid crystal display device of Example 3.
Figure 10:
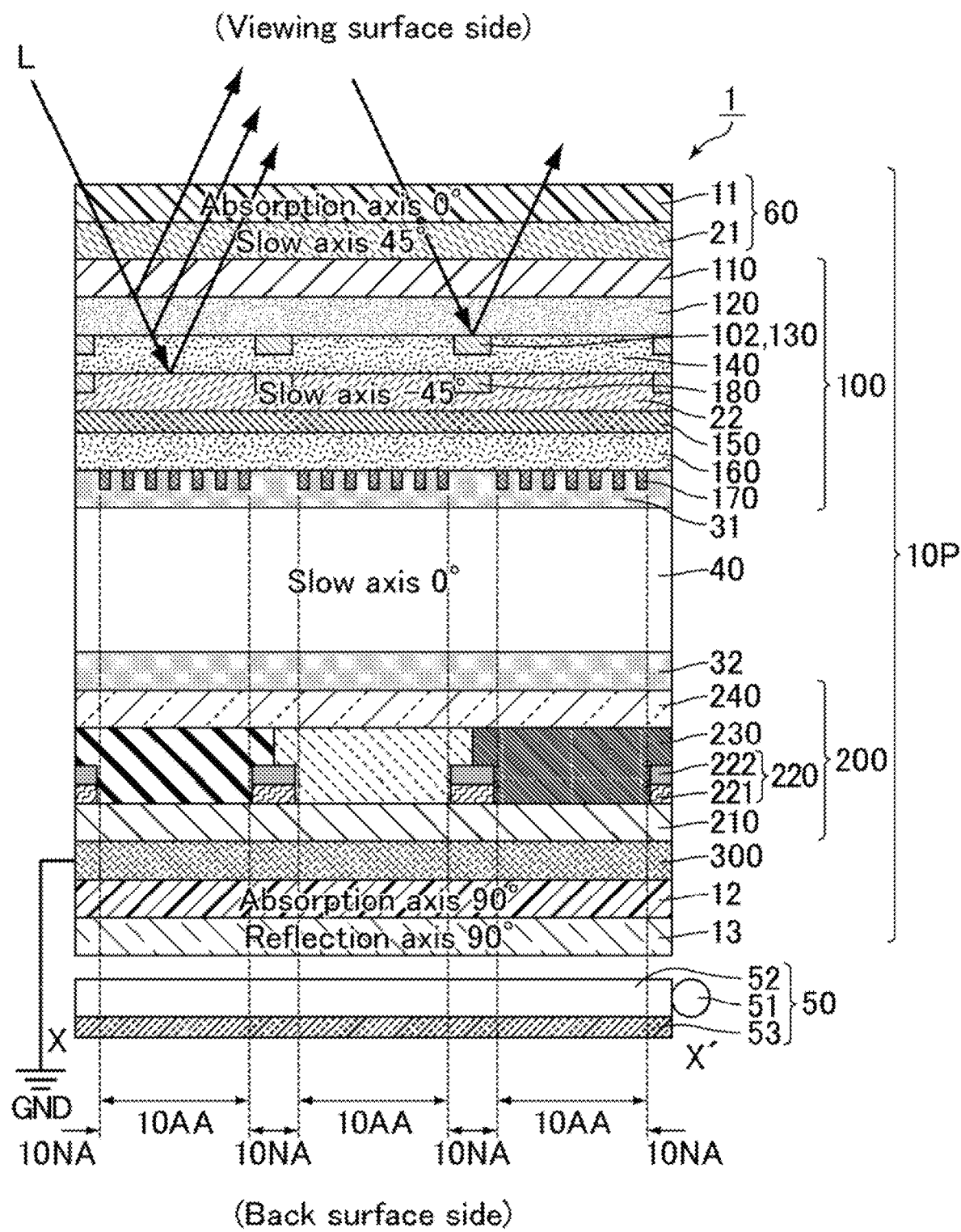
FIG. 10 is a schematic cross-sectional view of the liquid crystal display device of Example 3 taken along the X-X' line in FIGS. 8 and 9.
Figure 11:
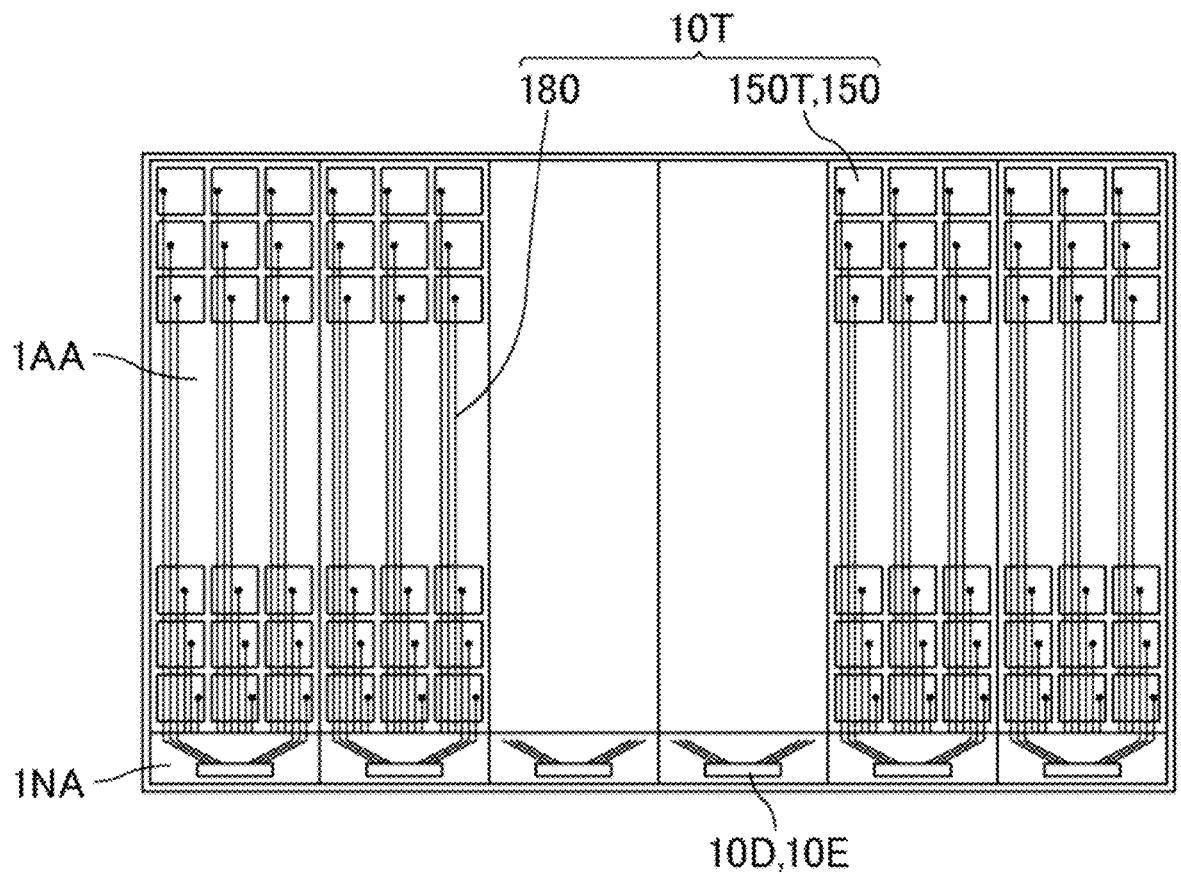
FIG. 11 is a schematic plan view showing a touch panel sensor included in the liquid crystal display device of Example 3.
Figure 12:
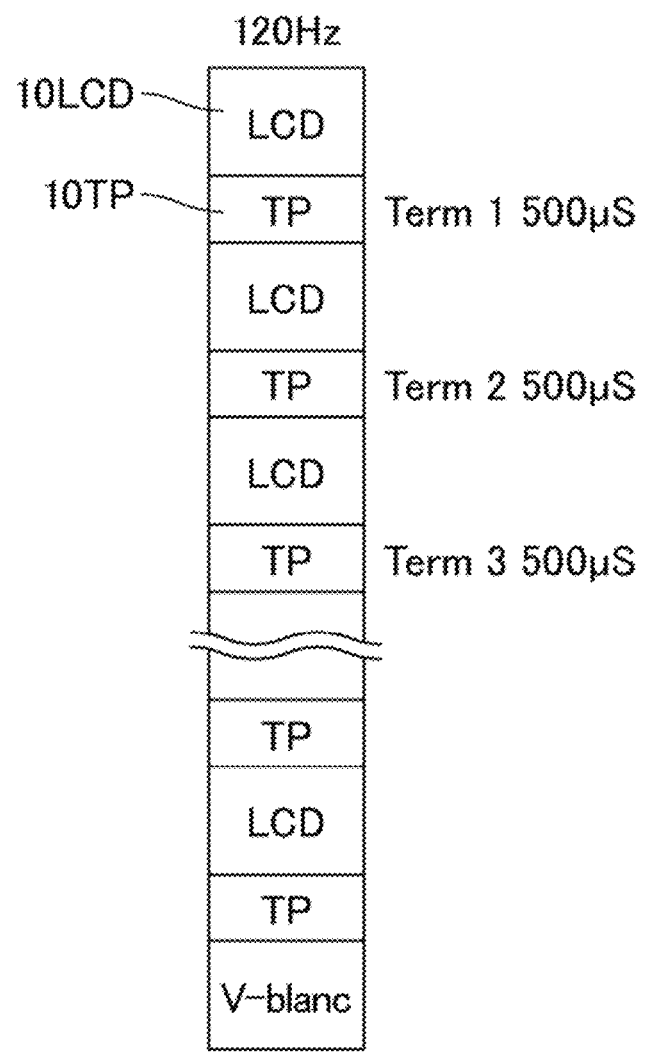
FIG. 12 is a timing chart showing the writing period and the sensing period in the liquid crystal display device of Example 3.

FIG. 8 is a schematic plan view showing the pixel configuration of a viewing surface side substrate (TFT substrate) of a liquid crystal display device of Example 3. FIG. 9 is a schematic plan view showing the pixel configuration of a back surface side substrate (CF substrate) included in the liquid crystal display device of Example 3. FIG. 10 is a schematic cross-sectional view of the liquid crystal display device of Example 3 taken along the X-X' line in FIGS. 8 and 9. FIG. 11 is a schematic plan view showing a touch panel sensor included in the liquid crystal display device of Example 3. FIG. 12 is a timing chart showing the writing period and the sensing period in the liquid crystal display device of Example 3. FIG. 8 and FIG. 9 each are a schematic plan view from the viewing surface side. The schematic cross-sectional view of the liquid crystal display device of Example 3 taken along the Y-Y' line in FIG. 8 is similar to that in FIG. 4.

A liquid crystal display device 1 of Example 3 shown in FIG. 8 to FIG. 10 and FIG. 4 was produced. The liquid crystal display device 1 of Example 3 had the same configuration as the liquid crystal display device 1 of Example 1, except that the surface of the second λ/4 retardation layer 22 on the viewing surface side was provided with touch panel driving lines 180, the common electrode 150 was divided to form touch panel electrodes 150T, and each touch panel driving line 180 was connected to a corresponding touch panel electrode 150T.

As shown in FIG. 11, the liquid crystal display device 1 of Example 3 includes a display region 1AA on which images are to be displayed, a non-display region 1NA surrounding the display region 1AA, and a self-capacitive in-cell touch panel sensor 10T including the touch panel electrodes 150T in the display region 1AA and the touch panel driving lines 180.

The touch panel electrodes 150T were disposed in a matrix pattern. Each touch panel driving line 180 was connected to a corresponding touch panel electrode 150T. The black circles shown in FIG. 11 each indicate a contact portion where a touch panel driving line 180 and a corresponding touch panel electrode 150T are connected. In the non-display region 1NA were disposed the drivers 10D connected to the corresponding source lines 102 and the corresponding touch panel driving lines 180. Each driver 10D was composed of IC chips and was part of the corresponding liquid crystal panel driving circuit 10E.

As shown in FIG. 11, the touch panel electrodes 150T were electrodes formed by dividing the common electrode 150 used to apply common voltage to the sub-pixels. As shown in FIG. 12, the touch panel electrodes 150T were set at a pixel reference potential (common voltage) as the common electrode 150 during a writing period 10LCD in which display signals, which are signals for display, were written into each sub-pixel, while they functioned as the touch panel electrodes 150T during a sensing period 10TP in which display signals were not written (gate scanning was not performed). Each touch panel electrode 150T was connected to one corresponding touch panel driving line 180. During the sensing period 10TP, signals for sensing were input from the drivers 10D to the corresponding touch panel electrodes 150T via the corresponding touch panel driving lines 180. Examples of the signals for sensing include pulse signals that are input to detect a change in capacitance in each touch panel electrode 150T.

During the sensing period 10TP, the pulse signals from the drivers 10D were input to the corresponding touch panel electrodes 150T via the corresponding touch panel driving lines 180. These changes in capacitance were detected by the drivers 10D, so that contact and/or approach of an indicator were/was successfully detected. The changes in capacitance were obtained by driving the touch panel sensor 10T multiple times during the sensing period 10TP. The drivers 10D also functioned as source drivers that supplied data signals to the corresponding source lines 102 and as touch sensor drivers that supplied pulse signals to the corresponding touch panel driving lines 180.

The touch panel sensor 10T in Example 3 included 84×45 (3780) touch panel electrodes 150T each having a size of 3.5 mm×3.7 mm. Each touch panel electrode 150T was connected to the corresponding driver 10D via the corresponding touch panel driving line 180. The touch panel driving line 180 was disposed between a source 102 and the common electrode 150 (touch panel electrode 150T) while overlapping the source line 102 via the first interlayer insulating film 140.

Example 4

Figure 13:
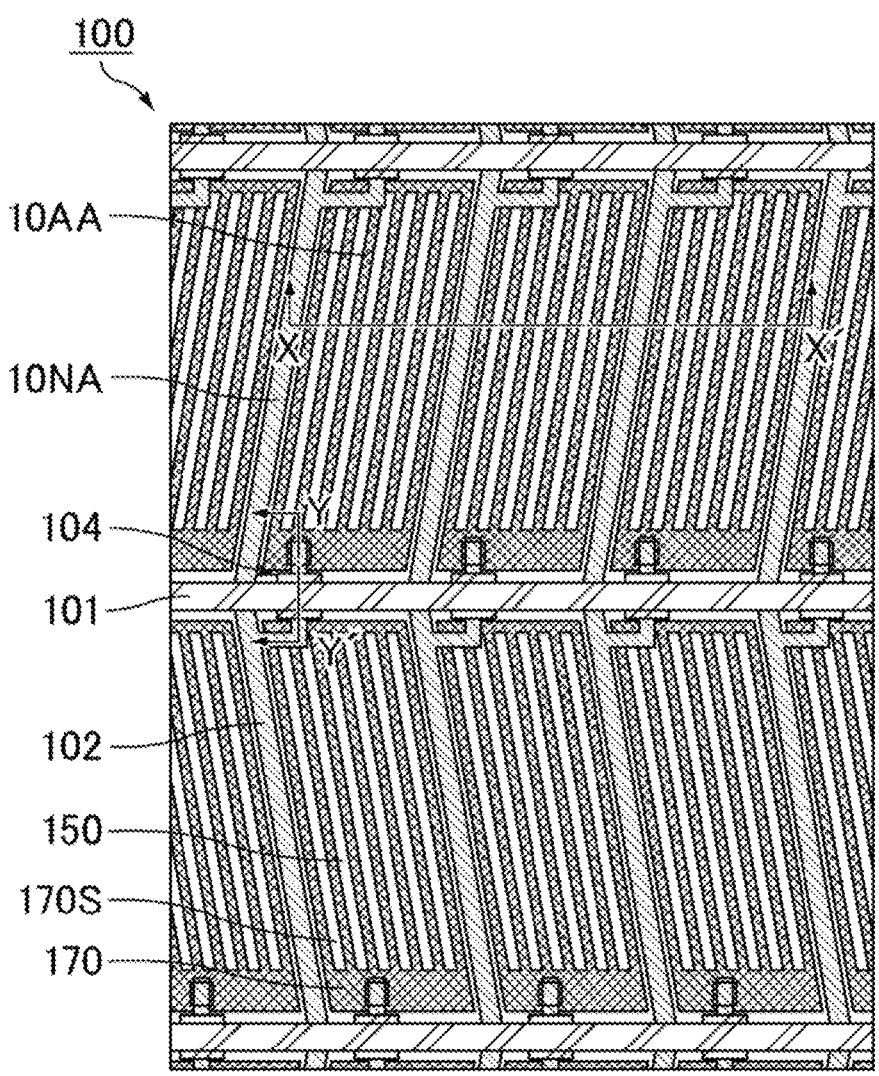
FIG. 13 is a schematic plan view showing the pixel configuration of a viewing surface side substrate (TFT substrate) included in a liquid crystal display device of Example 4.
Figure 14:
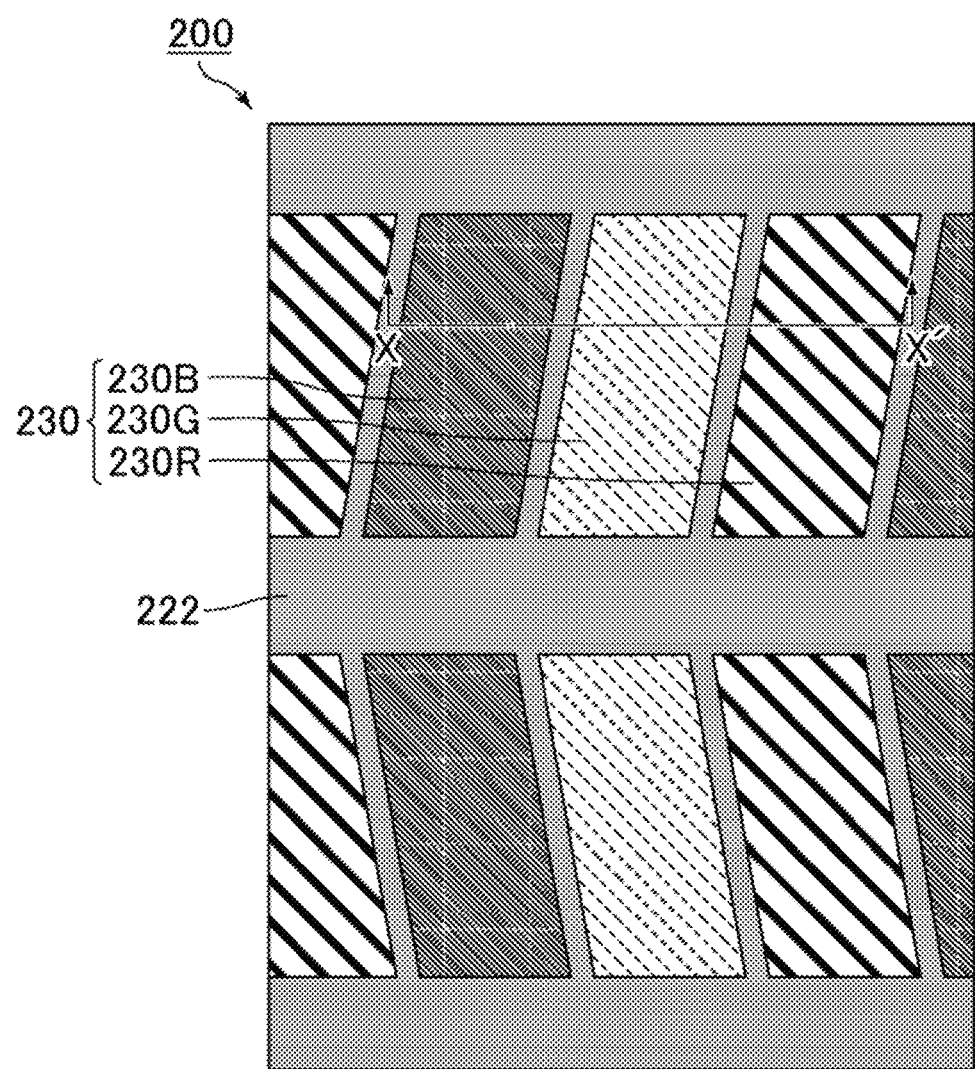
FIG. 14 is a schematic plan view showing the pixel configuration of a back surface side substrate (CF substrate) included in the liquid crystal display device of Example 4.
Figure 15:
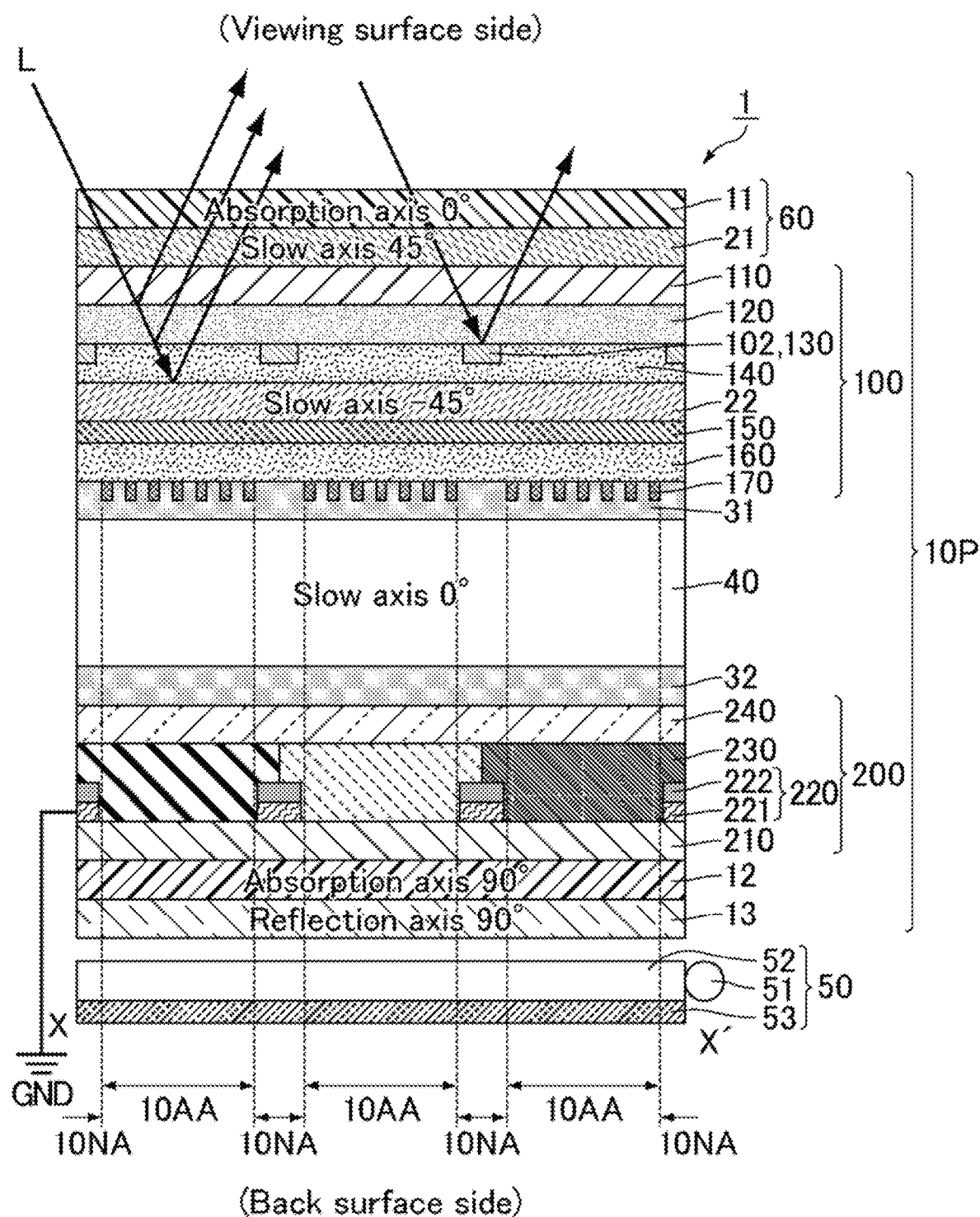
FIG. 15 is a schematic cross-sectional view of the liquid crystal display device of Example 4 taken along the X-X' line in FIGS. 13 and 14.

FIG. 13 is a schematic plan view showing the pixel configuration of a viewing surface side substrate (TFT substrate) included in a liquid crystal display device of Example 4. FIG. 14 is a schematic plan view showing the pixel configuration of a back surface side substrate (CF substrate) included in the liquid crystal display device of Example 4. FIG. 15 is a schematic cross-sectional view of the liquid crystal display device of Example 4 taken along the X-X' line in FIGS. 13 and 14. FIG. 13 and FIG. 14 each are a schematic plan view from the viewing surface side. The schematic cross-sectional view of the liquid crystal display device of Example 4 taken along the Y-Y' line in FIG. 13 is similar to that in FIG. 4.

A liquid crystal display device 1 of Example 4 shown in FIG. 13 to FIG. 15 and FIG. 4 was produced. The liquid crystal display device of Example 4 had the same configuration as the liquid crystal display device 1 of Example 1, except that it did not include the shield electrode 300 and the reflective layer 221 was connected to the ground terminal of the liquid crystal panel driving circuit via a silver paste.

Comparative Example 1

Figure 16:
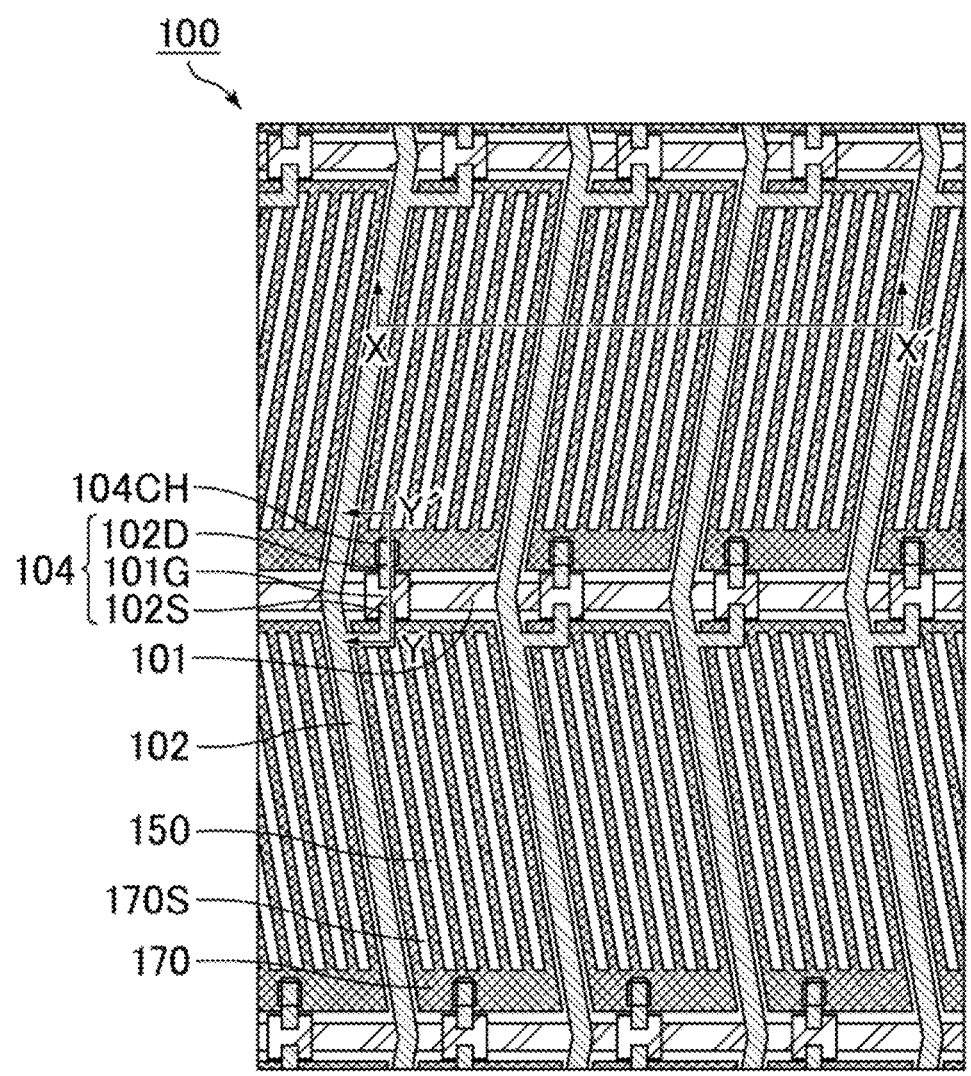
FIG. 16 is a schematic plan view showing the pixel configuration of a back surface side substrate (TFT substrate) of a liquid crystal display device of Comparative Example 1.
Figure 17:
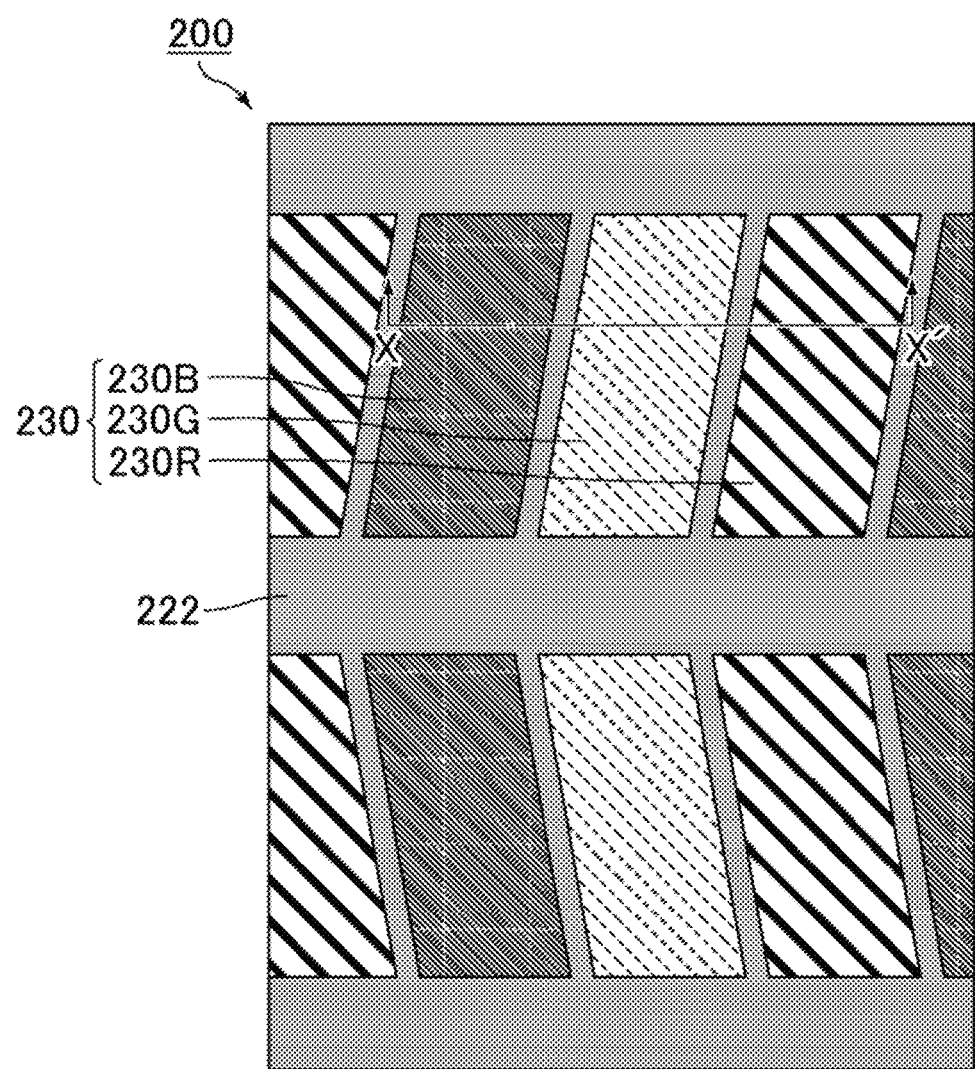
FIG. 17 is a schematic plan view showing the pixel configuration of a viewing surface side substrate (CF substrate) included in the liquid crystal display device of Comparative Example 1.
Figure 18:
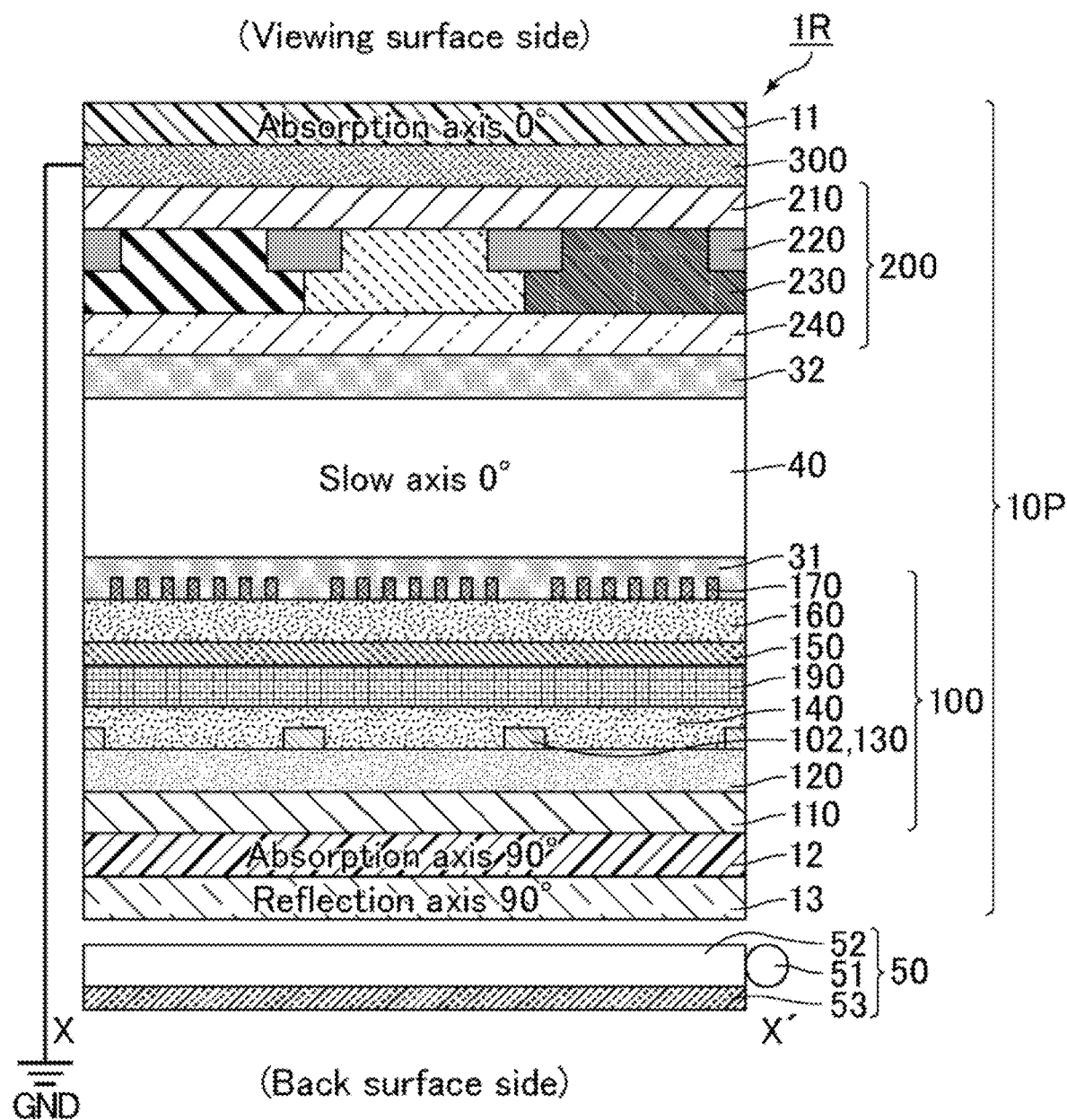
FIG. 18 is a schematic cross-sectional view of the liquid crystal display device of Comparative Example 1 taken along the X-X' line in FIGS. 16 and 17.
Figure 19:
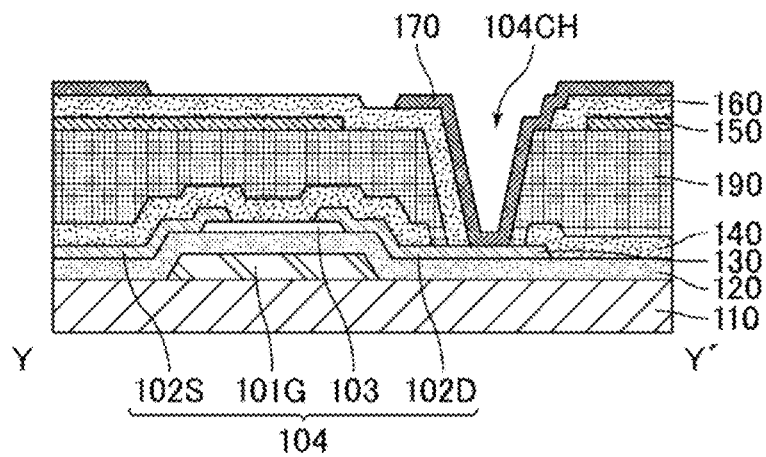
FIG. 19 is a schematic cross-sectional view of the back surface side substrate (TFT substrate) taken along the Y-Y' line in FIG. 16.

FIG. 16 is a schematic plan view showing the pixel configuration of a back surface side substrate (TFT substrate) of a liquid crystal display device of Comparative Example 1. FIG. 17 is a schematic plan view showing the pixel configuration of a viewing surface side substrate (CF substrate) included in the liquid crystal display device of Comparative Example 1. FIG. 18 is a schematic cross-sectional view of the liquid crystal display device of Comparative Example 1 taken along the X-X' line in FIGS. 16 and 17. FIG. 19 is a schematic cross-sectional view of the back surface side substrate (TFT substrate) taken along the Y-Y' line in FIG. 16. FIG. 16 and FIG. 17 each are a schematic plan view from the viewing surface side.

A liquid crystal display device 1R of Comparative Example 1 shown in FIG. 16 to FIG. 19 was produced. The liquid crystal display device 1R of Comparative Example 1 had the same configuration as the liquid crystal display device 1 of Example 1, except that the TFT substrate 100 was disposed on the back surface side, the CF substrate 200 and the shield electrode 300 were disposed on the viewing surface side, the first λ/4 retardation layer 21, the second λ/4 retardation layer 22, and the reflective layer 221 were not included, and the flattening film 190 was disposed between the first interlayer insulating film 140 and the common electrode 150.

Comparative Example 2

Figure 20:
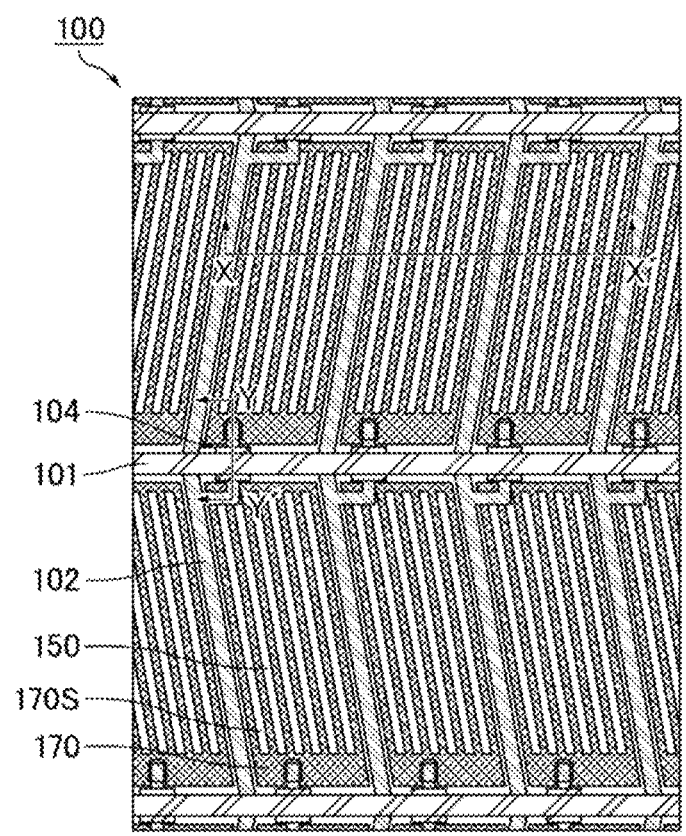
FIG. 20 is a schematic plan view showing the pixel configuration of a viewing surface side substrate (TFT substrate) of a liquid crystal display device of Comparative Example 2.
Figure 21:
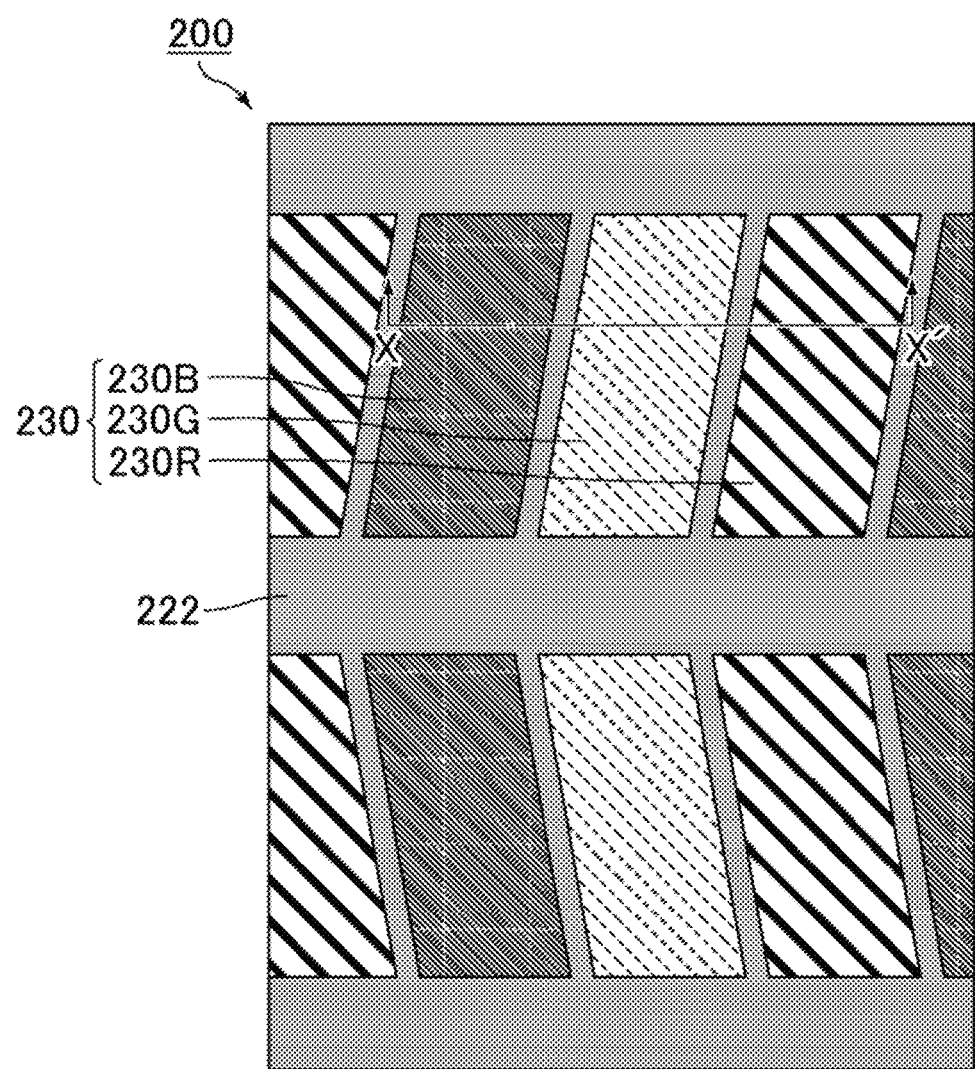
FIG. 21 is a schematic plan view showing the pixel configuration of a back surface side substrate (CF substrate) included in the liquid crystal display device of Comparative Example 2.
Figure 22:
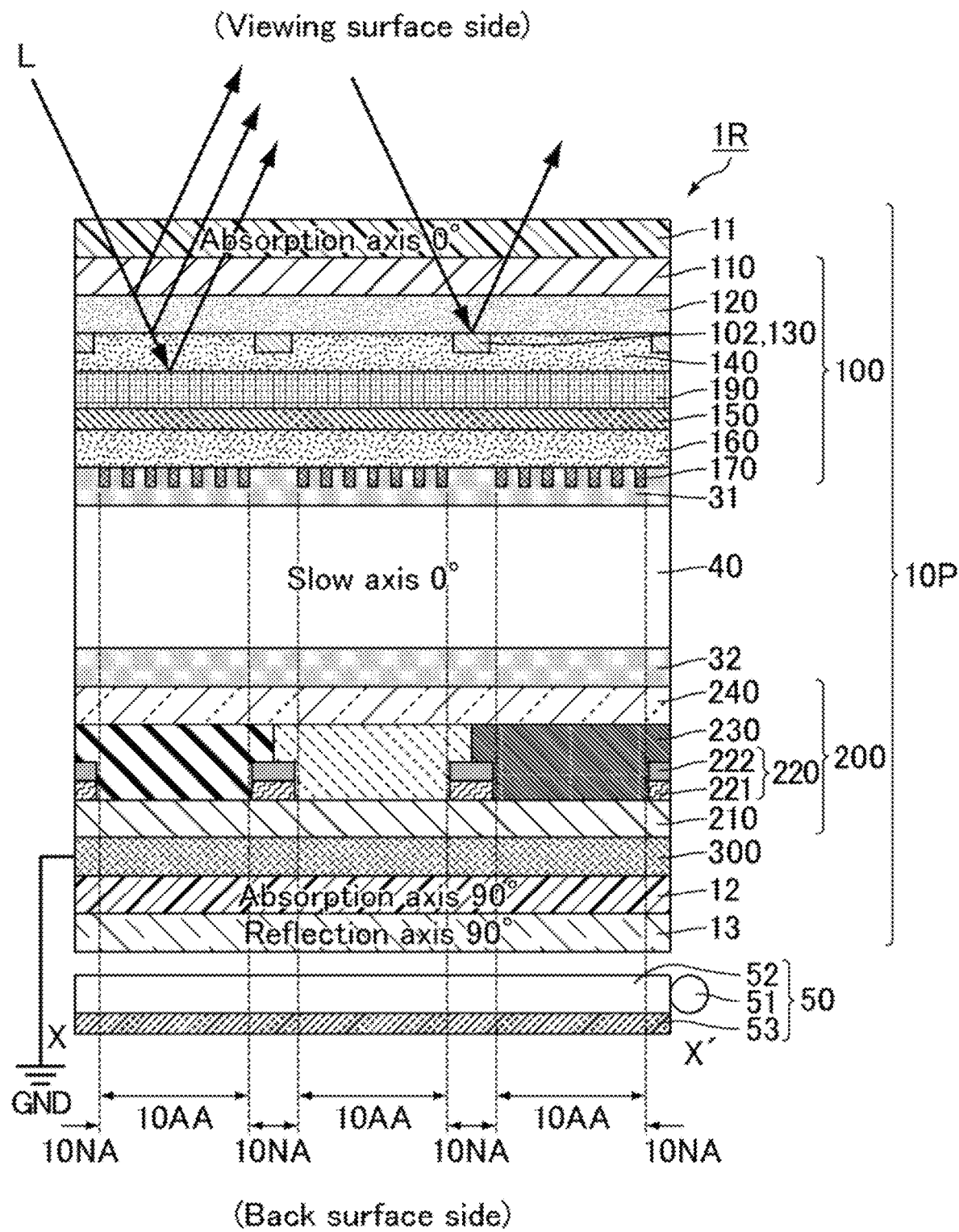
FIG. 22 is a schematic cross-sectional view of the liquid crystal display device of Comparative Example 2 taken along the X-X' line in FIGS. 20 and 21.
Figure 23:
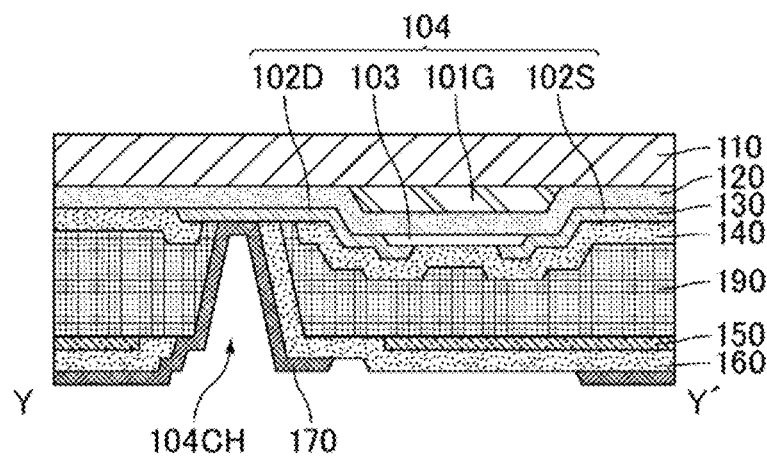
FIG. 23 is a schematic cross-sectional view of the viewing surface side substrate (TFT substrate) taken along the Y-Y' line in FIG. 20.

FIG. 20 is a schematic plan view showing the pixel configuration of a viewing surface side substrate (TFT substrate) of a liquid crystal display device of Comparative Example 2. FIG. 21 is a schematic plan view showing the pixel configuration of a back surface side substrate (CF substrate) included in the liquid crystal display device of Comparative Example 2. FIG. 22 is a schematic cross-sectional view of the liquid crystal display device of Comparative Example 2 taken along the X-X' line in FIGS. 20 and 21. FIG. 23 is a schematic cross-sectional view of the viewing surface side substrate (TFT substrate) taken along the Y-Y' line in FIG. 20. FIG. 20 and FIG. 21 each are a schematic plan view from the viewing surface side.

A liquid crystal display device 1R of Comparative Example 2 shown in FIG. 20 to FIG. 23 was produced. The liquid crystal display device 1R of Comparative Example 2 had the same configuration as the liquid crystal display device 1 of Example 1, except that the first λ/4 retardation layer 21 and the second λ/4 retardation layer 22 were not included and the flattening film 190 was disposed between the first interlayer insulating film 140 and the common electrode 150.

Comparative Example 3

Figure 24:
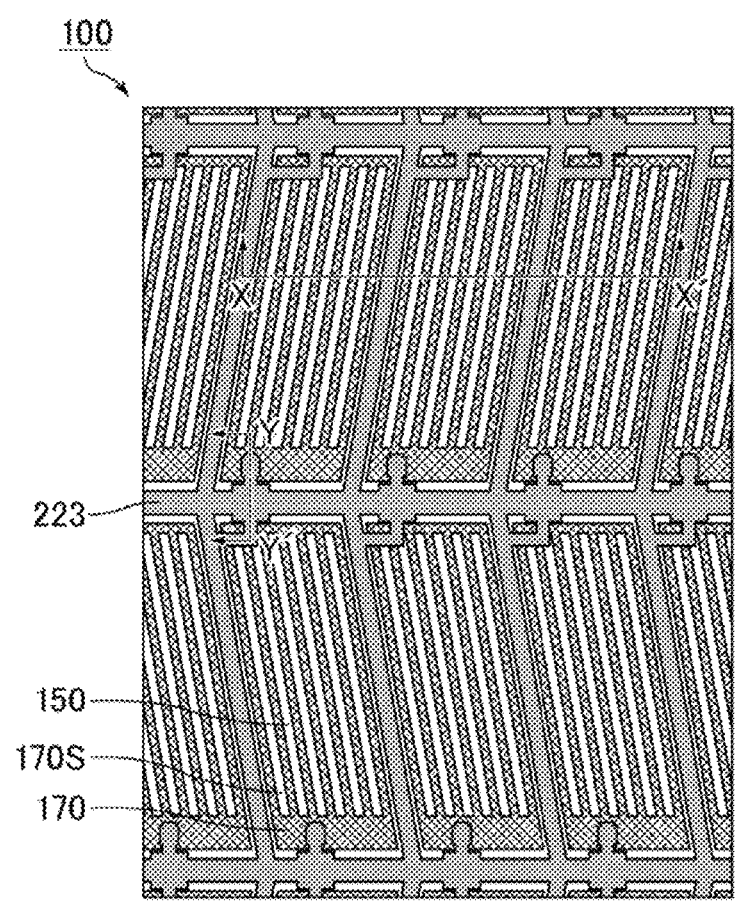
FIG. 24 is a schematic plan view showing the pixel configuration of a viewing surface side substrate (TFT substrate) of a liquid crystal display device of Comparative Example 3.
Figure 25:
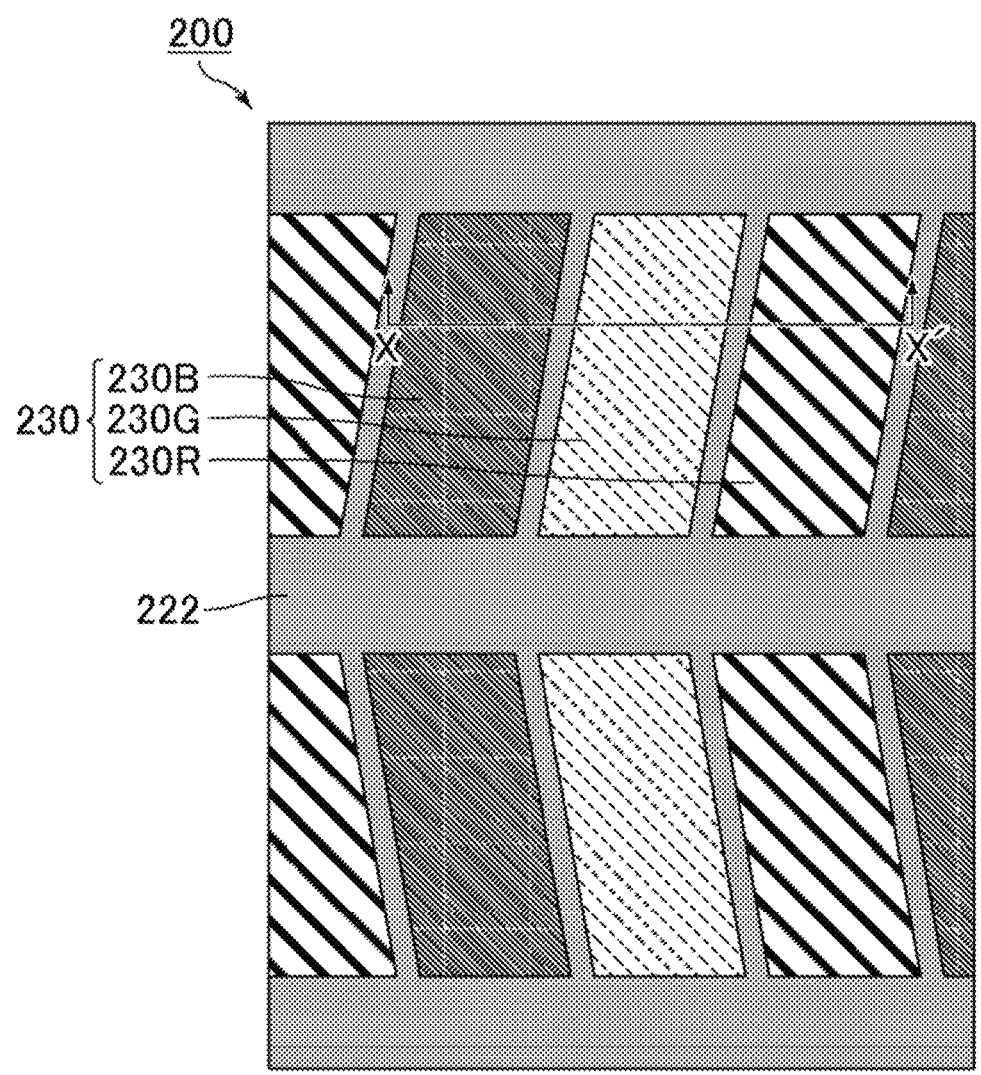
FIG. 25 is a schematic plan view showing the pixel configuration of a back surface side substrate (CF substrate) included in the liquid crystal display device of Comparative Example 3.
Figure 26:
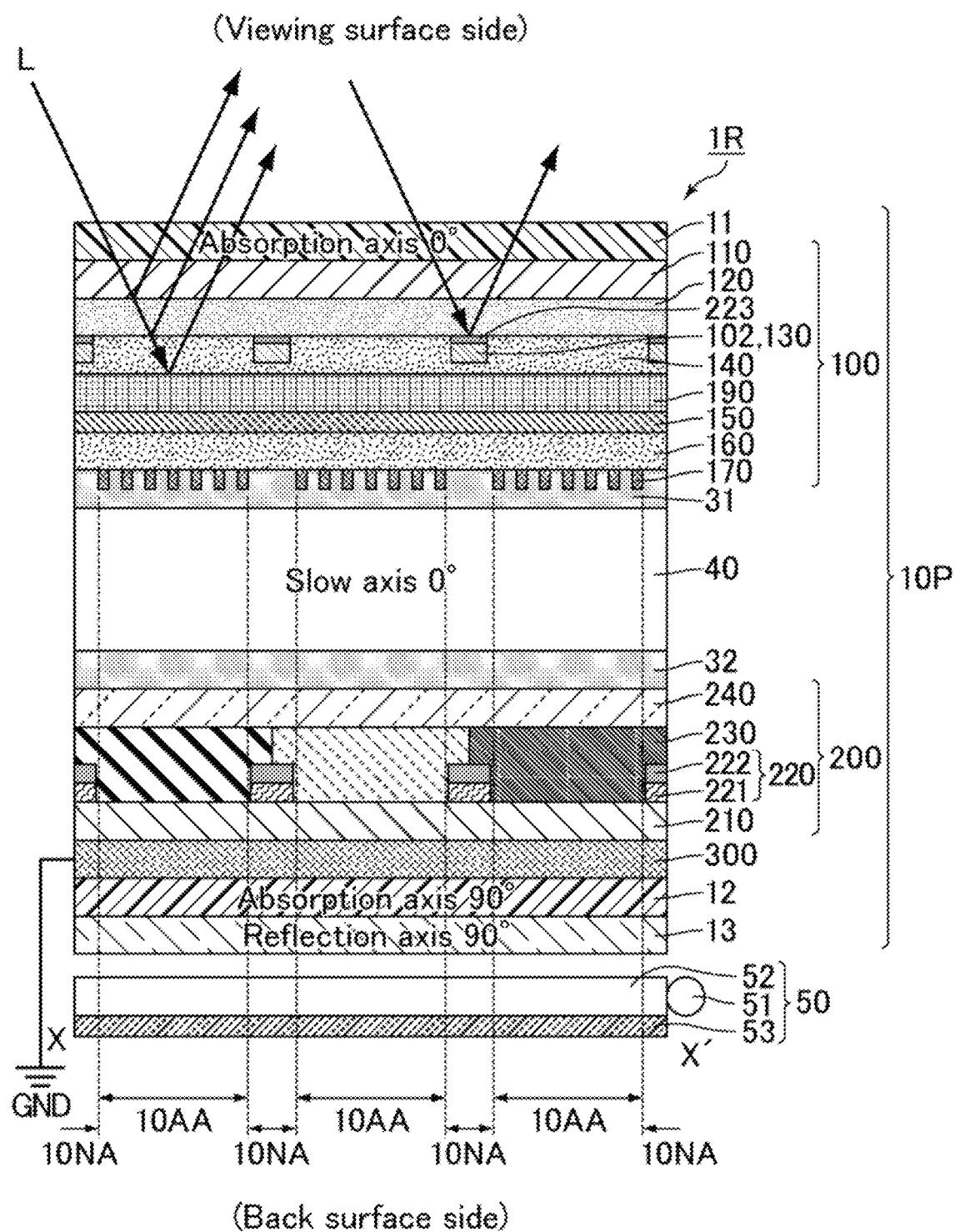
FIG. 26 is a schematic cross-sectional view of the liquid crystal display device of Comparative Example 3 taken along the X-X' line in FIGS. 24 and 25.
Figure 27:
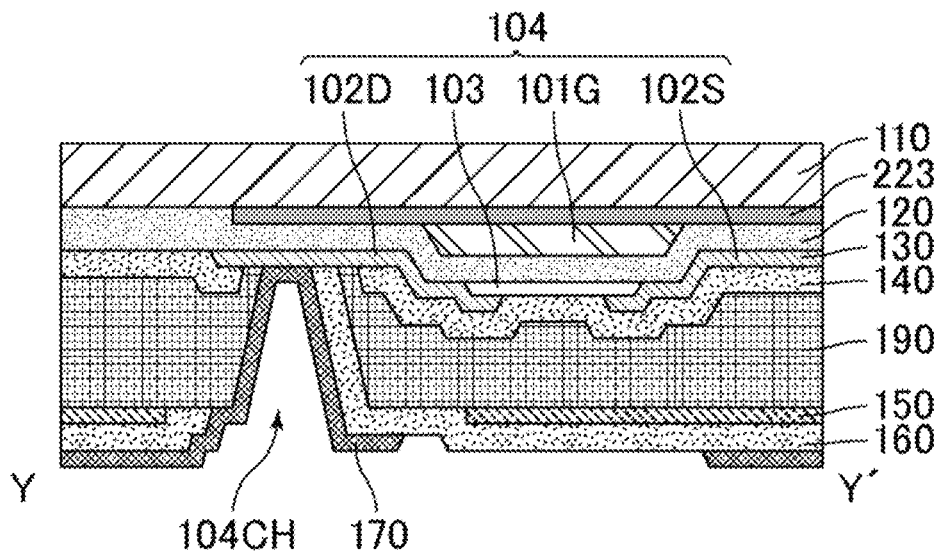
FIG. 27 is a schematic cross-sectional view of the viewing surface side substrate (TFT substrate) taken along the Y-Y' line in FIG. 24.

FIG. 24 is a schematic plan view showing the pixel configuration of a viewing surface side substrate (TFT substrate) of a liquid crystal display device of Comparative Example 3. FIG. 25 is a schematic plan view showing the pixel configuration of a back surface side substrate (CF substrate) included in the liquid crystal display device of Comparative Example 3. FIG. 26 is a schematic cross-sectional view of the liquid crystal display device of Comparative Example 3 taken along the X-X' line in FIGS. 24 and 25. FIG. 27 is a schematic cross-sectional view of the viewing surface side substrate (TFT substrate) taken along the Y-Y' line in FIG. 24. FIG. 24 and FIG. 25 each are a schematic plan view from the viewing surface side.

A liquid crystal display device 1R of Comparative Example 3 shown in FIG. 24 to FIG. 27 was produced. The liquid crystal display device 1R of Comparative Example 3 had the same configuration as the liquid crystal display device 1 of Example 1, except that the first λ/4 retardation layer 21 and the second λ/4 retardation layer 22 were not included, the flattening film 190 was disposed between the first interlayer insulating film 140 and the common electrode 150, and a black film 223 made of a metal oxide was disposed on the surface of the source line 102 on the viewing surface side.

<Evaluation Results>

The characteristics of the liquid crystal display devices produced in the examples and comparative examples were measured. The following Table 1 shows the results.

(1) Panel Internal Reflectance

Figure 28:
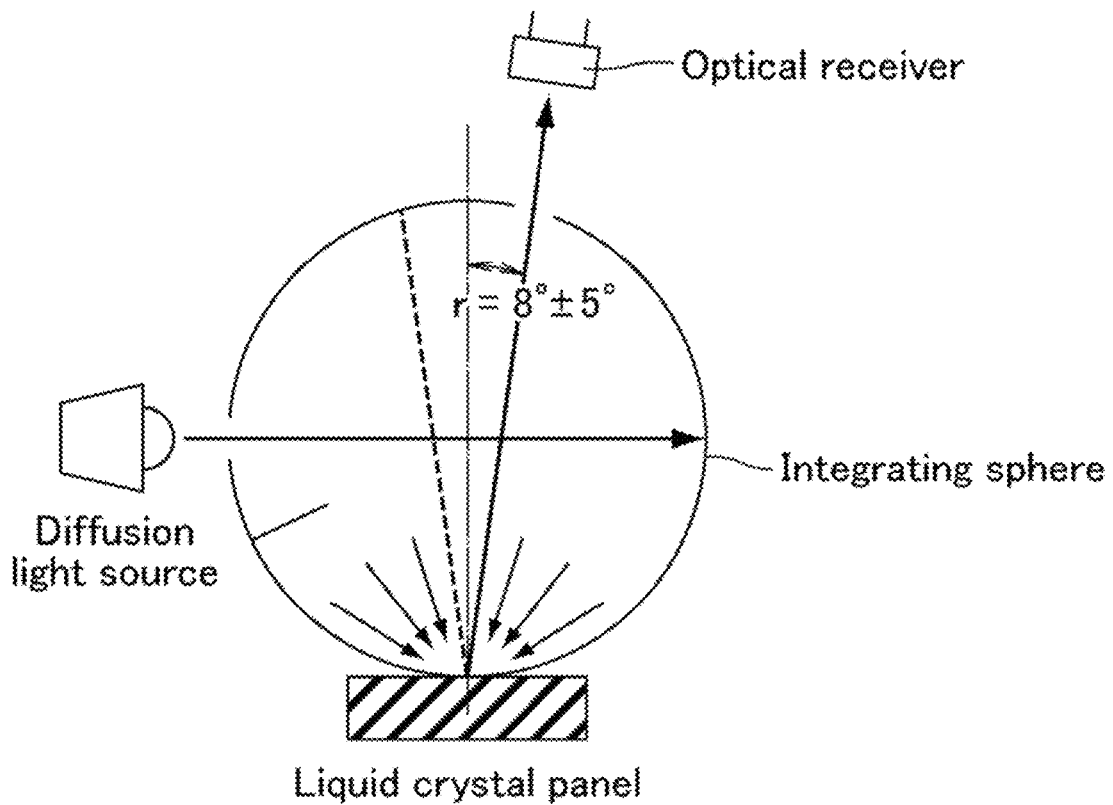
FIG. 28 is a view showing the method of measuring the internal reflectance.
Figure 29:
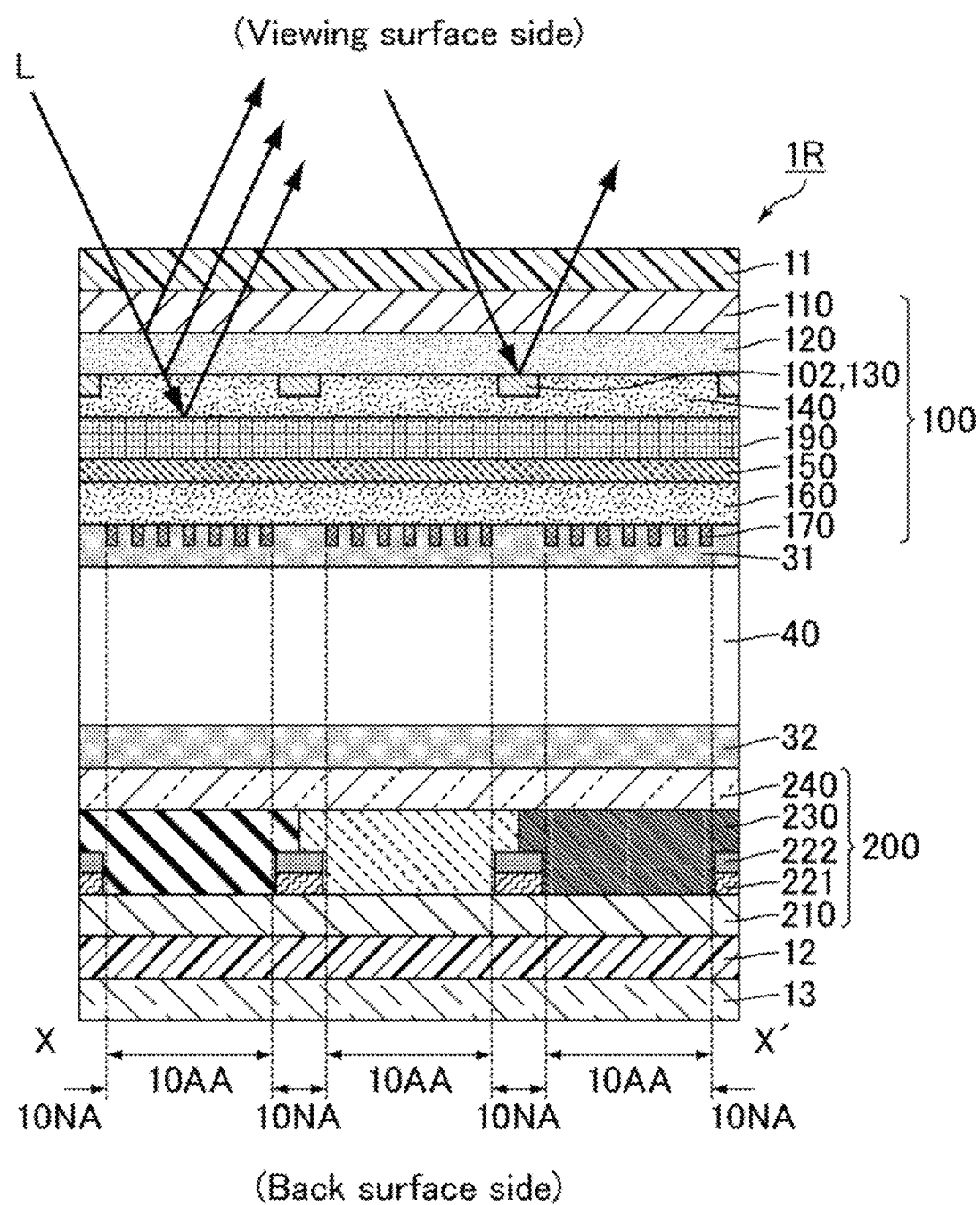
FIG. 29 is a schematic cross-sectional view of a liquid crystal display device of a comparative embodiment.

FIG. 28 is a view showing the method of measuring the internal reflectance. A value obtained by subtracting the reflectance on the polarizing plate surface from the total reflectance on the liquid crystal panel surface was used as the panel internal reflectance. The internal reflectance was measured, as shown in FIG. 28, by allowing light from a diffusion light source (pulsed xenon lamp) to be incident into an integrating sphere, and receiving at an angle of 8° the light reflected by the liquid crystal panel surface. In order to calculate the internal reflection of the liquid crystal panel, the surface reflectance on the polarizing plate attached to the liquid crystal panel surface needs to be subtracted. Thus, separately from the liquid crystal panel reflectance measurement, a sample was produced by attaching the same polarizing plate as that attached to the liquid crystal panel surface to a plate whose back surface was able to perfectly absorb light, such as a black acrylic plate, so that the surface reflectance on the polarizing plate surface was measured. The internal reflectance was measured using CM-2600d (available from Konica Minolta, Inc.).

(2) White Luminance, Black Luminance, Dark Room CR, and White Luminance Increase Ratio The luminance when white display was provided at the highest grayscale (grayscale of 255) was measured in a dark room as the white luminance. The luminance when black display was provided at the lowest grayscale (grayscale of 0)

was measured in a dark room as the black luminance. The ratio between the white luminance and the black luminance of each liquid crystal display device was calculated as the dark room contrast ratio (dark room CR). The ratio between the white luminance of each liquid crystal display device and the white luminance of the liquid crystal display device of Comparative Example 1 was calculated as the white luminance increase ratio. The backlight luminance was 6000 cd/cm². The backlight used was a common backlight including two lens sheets, i.e., a backlight including a first lens sheet with an uneven portion having a first ridge, a second lens sheet with an uneven portion having a second ridge perpendicular to the first ridge, a diffusing sheet, a light guide plate, and an edge light (LED). The lens sheets used were BEF series available from 3M Japan Limited. SR-UL1 (available from Topcon Corporation) was used as the luminance measurement device to perform measurement with a 1° field of view.

(3) Bright Room CR

The white luminance and the black luminance were measured under external light of 20000 lux in the state where an anti-reflection (AR) film having a reflectance of 0.3% was attached to the liquid crystal panel surface. The ratio between the white luminance and the black luminance was determined as the bright room contrast ratio (bright room CR). In order to achieve the display quality satisfying the practical use requirements, the bright room CR is preferably higher than 10.

21 and the second $\lambda/4$ retardation layer 22. Reflection by a layer outside these layers, for example, the shield electrode 300 disposed on the surface of the CF substrate 200 on the back surface side cannot be suppressed by the circularly polarizing plate 60. Eliminating the shield electrode 300 as in Example 4 enables not only further reduction in the internal reflectance but also reduction in the cost of the liquid crystal panel.

REFERENCE SIGNS LIST 1, 1R: liquid crystal display device
1AA: display region
1AN: non-display region
10AA: pixel region
10D: driver
10E: liquid crystal panel driving circuit
10LCD: writing period
10NA: region outside pixel region
10P: liquid crystal panel
10T: touch panel sensor
10TP: sensing period
11: first linearly polarizing plate
12: second linearly polarizing plate
13: reflective polarizing plate
21: first $\lambda/4$ retardation layer (out-cell $\lambda/4$ retardation layer)
22: second $\lambda/4$ retardation layer (in-cell $\lambda/4$ retardation layer)

TABLE 1

|  | Comparative Example 1 | Comparative Example 2 | Comparative Example 3 | Example 1 | Example 2 | Example 3 | Example 4 |
|---|---|---|---|---|---|---|---|
| Panel internal reflectance | 1.7% | 7.5% | 2.3% | 0.3% | 0.5% | 0.4% | 0.2% |
| White luminance | 500 cd/m² | 580 cd/m² | 580 cd/m² | 580 cd/m² | 580 cd/m² | 580 cd/m² | 580 cd/m² |
| White luminance increase ratio | 100% | 118% | 118% | 118% | 118% | 118% | 118% |
| Black luminance | 0.28 cd/m² | 0.32 cd/m² | 0.32 cd/m² | 0.32 cd/m² | 0.32 cd/m² | 0.32 cd/m² | 0.32 cd/m² |
| Dark room CR | 1800 | 1800 | 1800 | 1800 | 1800 | 1800 | 1800 |
| Bright room CR | 9 | 3 | 8 | 31 | 23 | 27 | 37 |

In each of Examples 1 to 4, seemingly, the internal reflection by the layers between the first $\lambda/4$ retardation layer 21 and the second $\lambda/4$ retardation layer 22 was further suppressed by the circularly polarizing plate 60, so that the internal reflectance was suppressed as compared with the internal reflectances in Comparative Example 1 to 3.

Also, the liquid crystal display device 1 of Example 4 without the shield electrode 300 further reduced the internal reflectance as compared with the liquid crystal display devices 1 of Examples 1 to 3 with the shield electrode 300. The refractive index of a transparent conductive film such as an ITO film used as the shield electrode 300 is about 2, which is significantly high, while the refractive indices of components adjacent to the shield electrode 300 (supporting substrate 210, organic film of the second linearly polarizing plate 12 (including a pressure-adhesive agent)) was about 1.5. Thus, reflection occurs in the interfaces between the shield electrode 300 and layers adjacent thereto, increasing the panel internal reflectance. In Example 4 without the shield electrode 300, internal reflection due to the shield electrode does not occur, so that the internal reflectance was seemingly successfully reduced as compared with Examples 1 to 3. The internal reflection which can be further suppressed by the circularly polarizing plate 60 is the internal reflection by the layers between the first $\lambda/4$ retardation layer 31: first alignment film
32: second alignment film
40: liquid crystal layer
50: backlight
51: light source
52: light guide plate
53: reflector
60: circularly polarizing plate
100: thin-film transistor (TFT) substrate
101: gate line
101G: gate electrode
102: source line
102S: source electrode
102D: drain electrode
103: thin-film semiconductor layer
104: thin-film transistor (TFT)
104CH: contact hole
110, 210: supporting substrate
120: gate insulator
130: source line layer
140: first interlayer insulating film
150: common electrode
150T: touch panel electrode
160: second interlayer insulating film
170: pixel electrode 170S: slit
180: touch panel driving line
190: flattening film
200: color filter (CF) substrate
220: black matrix layer
221: reflective layer
222, 223: black film
230: color filter (CF) layer
230B: blue color filter
230G: green color filter
230R: red color filter
240: overcoat layer
300: shield electrode
L: external light

What is claimed is:

1. A liquid crystal display device comprising, sequentially from a viewing surface side to a back surface side:
 a circularly polarizing plate including a linearly polarizing plate and a first λ/4 retardation layer;
 a thin-film transistor substrate including a pair of electrodes disposed in a pixel region and a metal line disposed outside the pixel region;
 a liquid crystal layer containing liquid crystal molecules aligned parallel to the thin-film transistor substrate, alignment of the liquid crystal molecules varying in response to an electric field generated by application of voltage to the pair of electrodes;
 a color filter substrate including a color filter layer; and
 a backlight,
 the thin-film transistor substrate including a second λ/4 retardation layer,
 the color filter substrate including a reflective layer disposed outside the pixel region and configured to reflect incident light from the backlight toward the back surface.

2. The liquid crystal display device according to claim 1, wherein the color filter substrate includes a black film disposed on a viewing surface side of the reflective layer.

3. The liquid crystal display device according to claim 1, wherein the thin-film transistor substrate includes a touch panel driving line disposed closer to the viewing surface than the second λ/4 retardation layer is.

4. The liquid crystal display device according to claim 1, wherein the liquid crystal display device comprises a shield electrode between the circularly polarizing plate and the thin-film transistor substrate.

5. The liquid crystal display device according to claim 1, wherein the second λ/4 retardation layer is a cured product of a photo-polymerizable liquid crystal material.

6. The liquid crystal display device according to claim 1, further comprising a liquid crystal panel driving circuit, wherein the reflective layer is connected to a ground terminal of the liquid crystal panel driving circuit.

7. The liquid crystal display device according to claim 6, wherein the liquid crystal layer contains negative liquid crystals.

* * * * *